United States Patent
Iwama et al.

(10) Patent No.: US 10,346,452 B2
(45) Date of Patent: Jul. 9, 2019

(54) ANSWERING OF CONSECUTIVE QUESTIONS

(71) Applicant: INTERNATIONAL BUSINESS MACHINES CORPORATION, Armonk, NY (US)

(72) Inventors: Futoshi Iwama, Tokyo (JP); Satoshi Masuda, Tokyo (JP); Kohtaroh Miyamoto, Tokyo (JP); Hironori Takeuchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 15/347,091

(22) Filed: Nov. 9, 2016

(65) Prior Publication Data

US 2018/0129734 A1 May 10, 2018

(51) Int. Cl.
  *G06F 16/00* (2019.01)
  *G06F 16/33* (2019.01)
  *G06F 16/2452* (2019.01)
  *G06F 16/2457* (2019.01)
  (Continued)

(52) U.S. Cl.
  CPC ...... *G06F 16/3344* (2019.01); *G06F 16/2457* (2019.01); *G06F 16/24522* (2019.01); *G06F 16/90332* (2019.01); *G06F 16/9535* (2019.01)

(58) Field of Classification Search
  CPC ......... G06F 17/30654; G06F 17/30864; G06F 17/2795; G06F 17/3066; G06F 17/30675; G06F 17/30867; G06F 17/30451; G06F 17/30873; G06F 17/30684; G06F 17/30637; G06F 17/30734; G06F 17/30029; G06F 17/30038; G06F 17/30958; G06F 17/30; G06F 16/3329; G06F 17/28; G06F 16/9535; G06F 16/3332; G06F 16/334; G06F 16/63; G06F 16/24522; G06F 16/3344;
  (Continued)

(56) References Cited

U.S. PATENT DOCUMENTS

2004/0254917 A1* 12/2004 Brill ................. G06F 17/30654
2007/0083506 A1*  4/2007 Liddell .............. G06F 17/2785
(Continued)

OTHER PUBLICATIONS

Yumak, Z. et al., "Modelling Multi-Party Interactions among Virtual Characters, Robots, and Humans" Presence (Aug. 2014) pp. 172-190, vol. 23, No. 2.

*Primary Examiner* — Michelle N Owyang
(74) *Attorney, Agent, or Firm* — Tutunjian & Bitetto, P.C.; Vazken Alexanian

(57) ABSTRACT

A method for answering consecutive questions, using a system which can access a database is provided. The method includes retrieving a questioner identifier associated with a questioner in response to receipt of a question from the questioner. The method also includes obtaining, using the questioner identifier, a history on class labels which were assigned to questions made by the questioner in the past and choosing a class label among the class labels in the history. The method further includes obtaining a list of keywords of the question and judging whether or not each keyword in the keyword list matches a representative keyword in any node among one or more nodes which exist in a hierarchy level in the database, or matches a synonym of the representative keyword.

25 Claims, 17 Drawing Sheets

(51) Int. Cl.
*G06F 16/9032* (2019.01)
*G06F 16/9535* (2019.01)

(58) Field of Classification Search
CPC ...... G06F 17/271; G06F 16/435; G06F 16/00;
G06F 16/90332
USPC .................................................. 707/705–780
See application file for complete search history.

(56) References Cited

U.S. PATENT DOCUMENTS

| | | | |
|---|---|---|---|
| 2011/0040767 A1* | 2/2011 | Kunjithapatham | G06F 17/30734 707/749 |
| 2011/0055699 A1* | 3/2011 | Li | G06F 17/30864 715/709 |
| 2011/0307435 A1* | 12/2011 | Overell | G06F 17/278 706/46 |
| 2016/0110415 A1* | 4/2016 | Clark | G06F 17/30451 707/774 |
| 2016/0114488 A1 | 4/2016 | Mascorro Medina et al. | |
| 2016/0232222 A1* | 8/2016 | McCloskey | G06F 17/30598 |
| 2016/0247068 A1* | 8/2016 | Lin | G06F 17/28 |
| 2017/0161370 A1* | 6/2017 | Endo | G06T 11/206 |

* cited by examiner

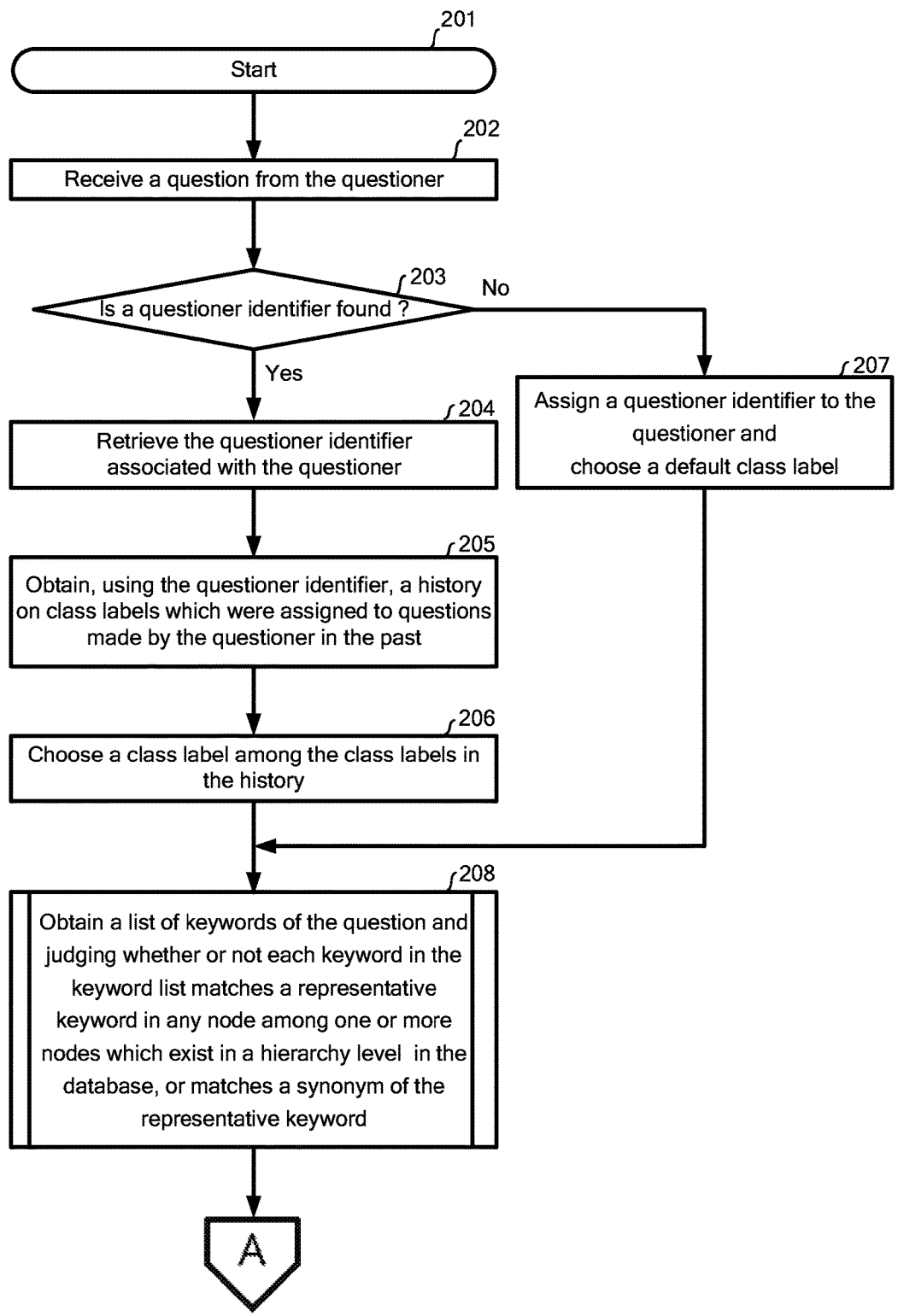

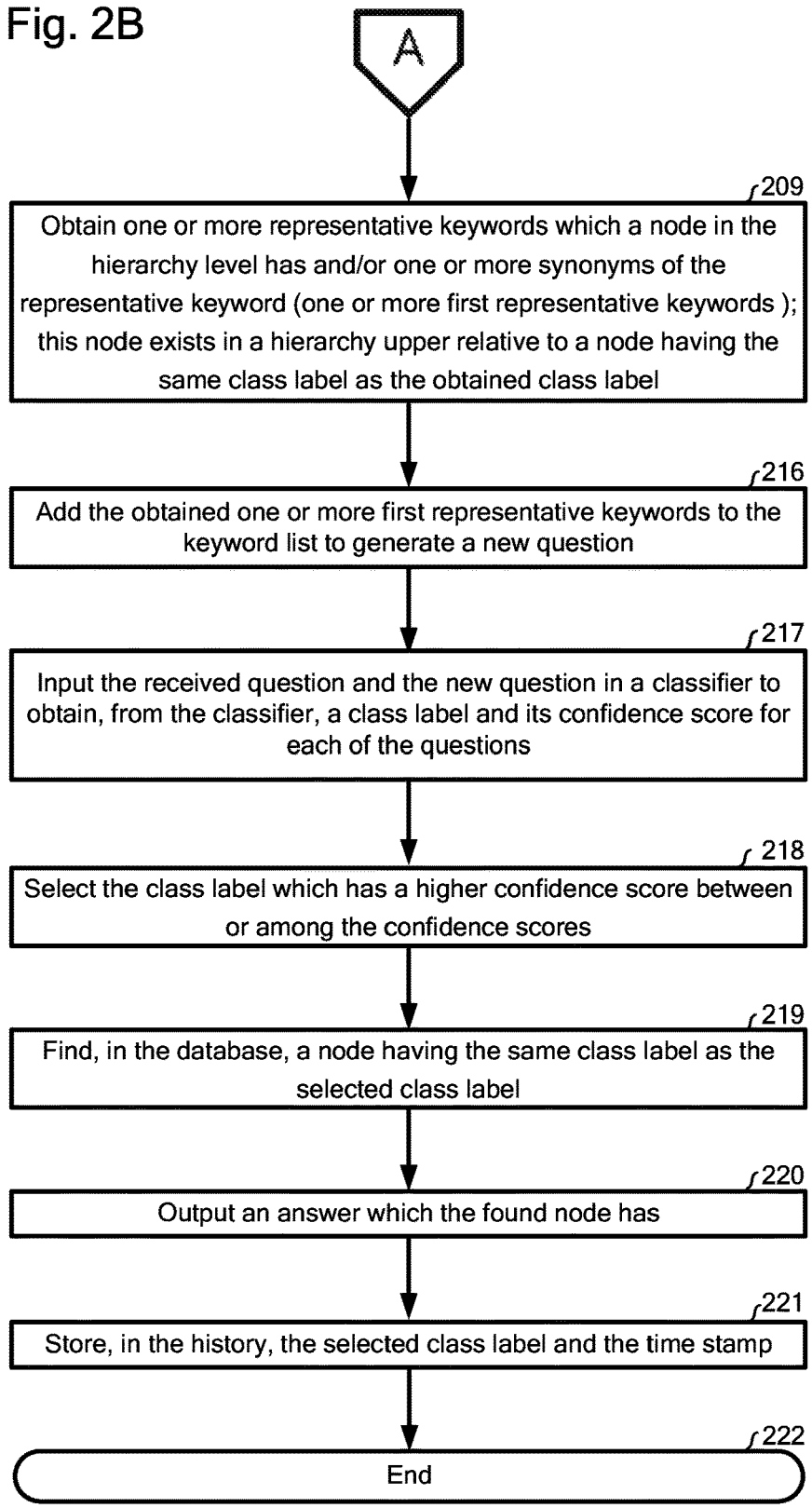

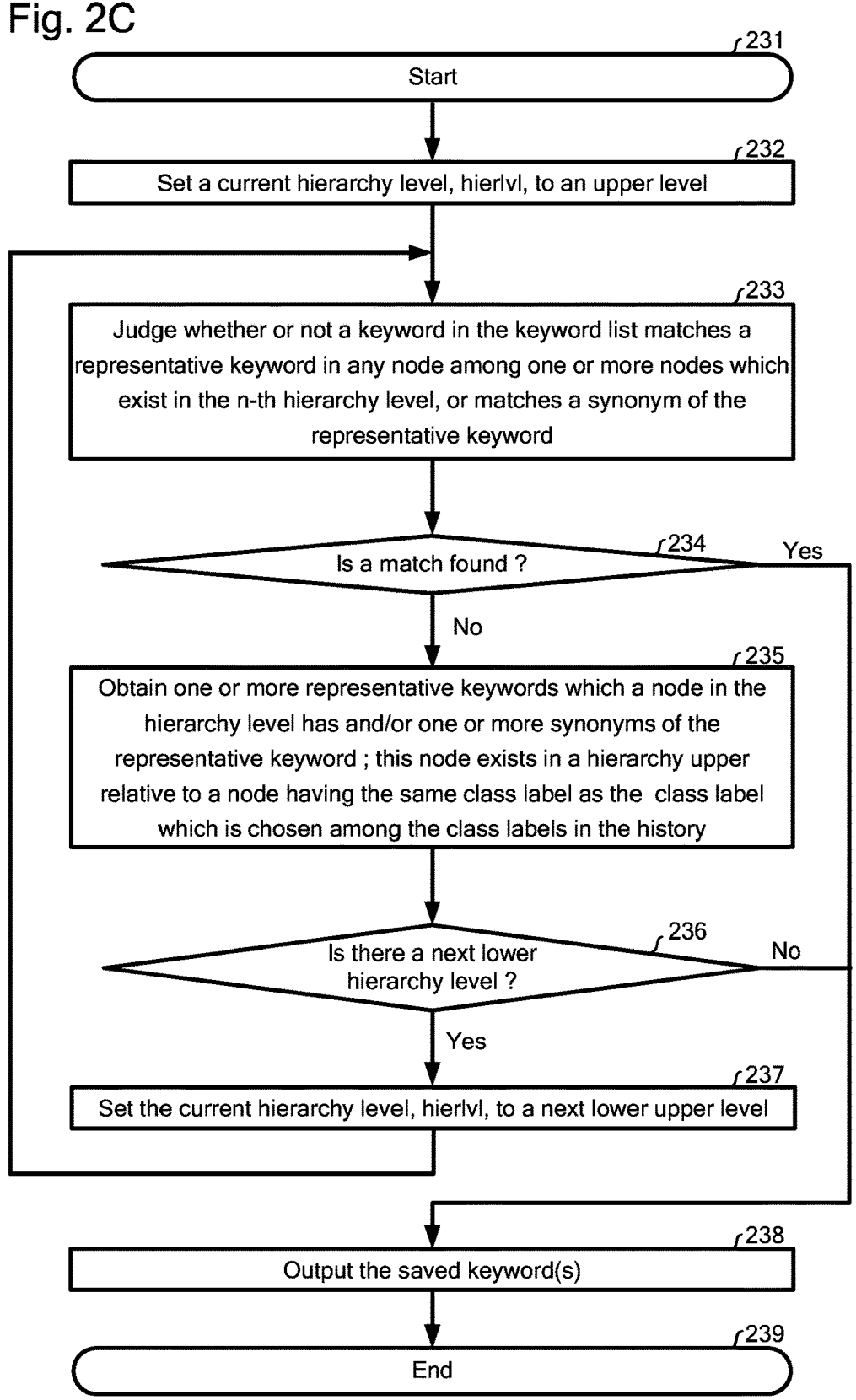

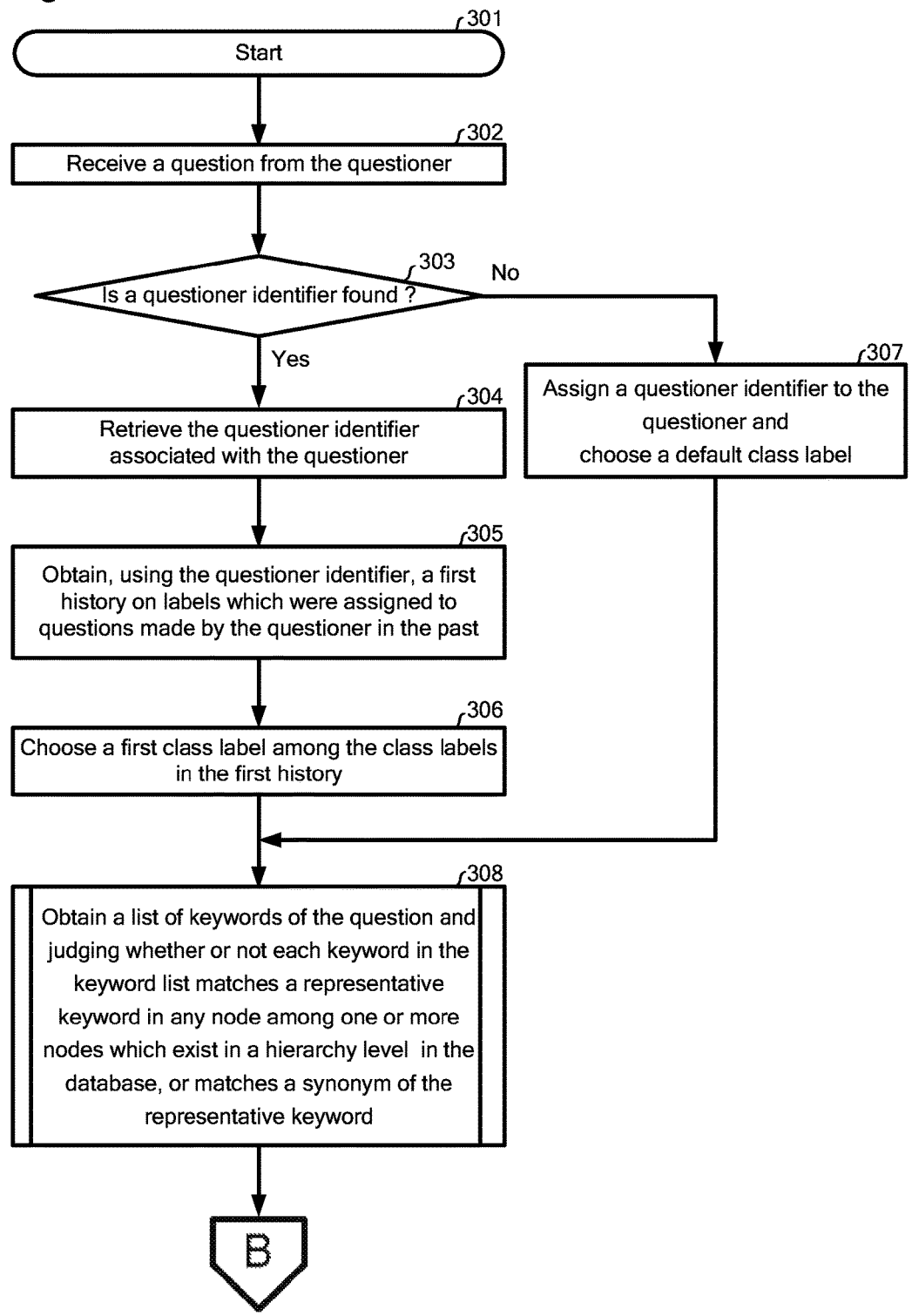

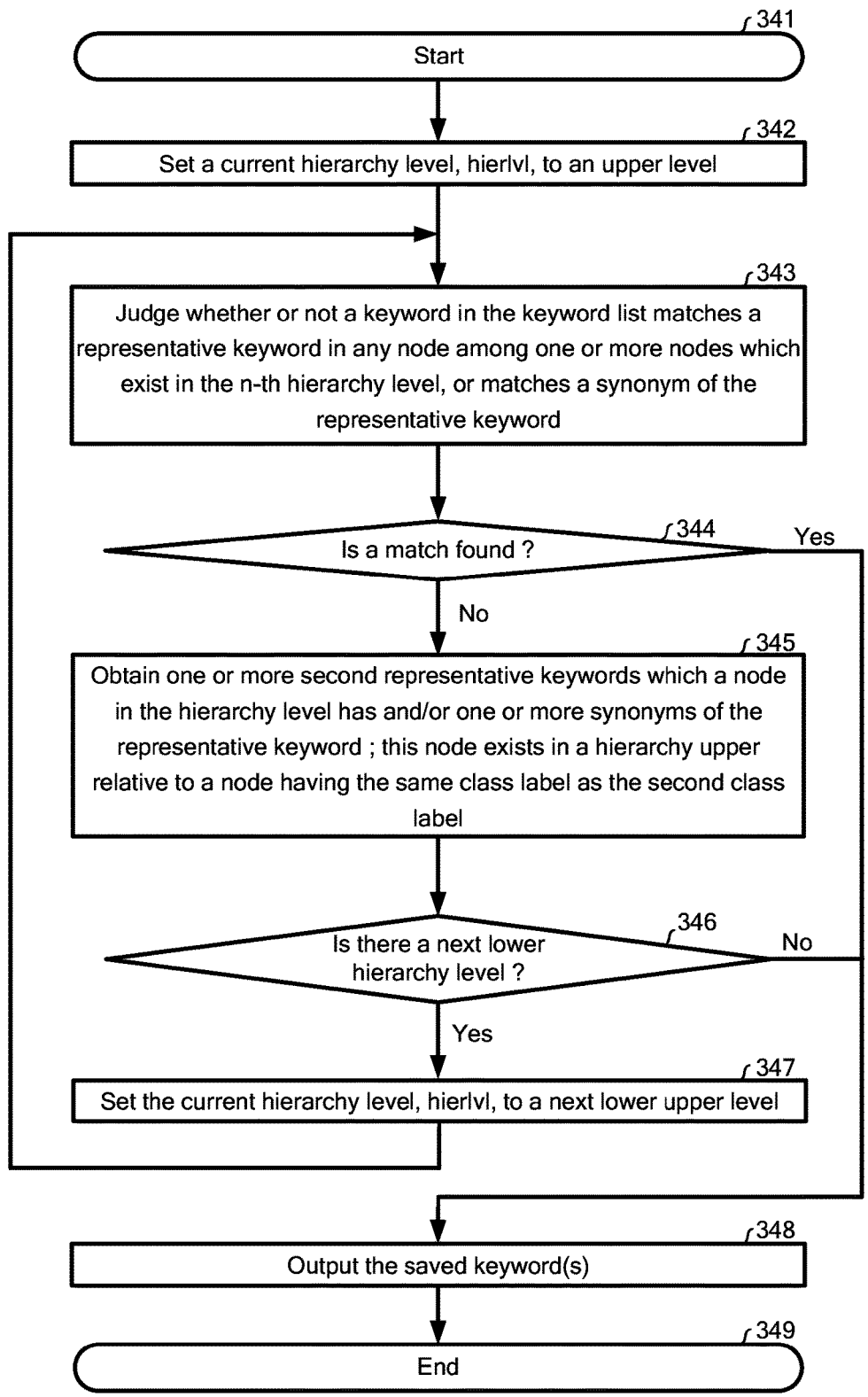

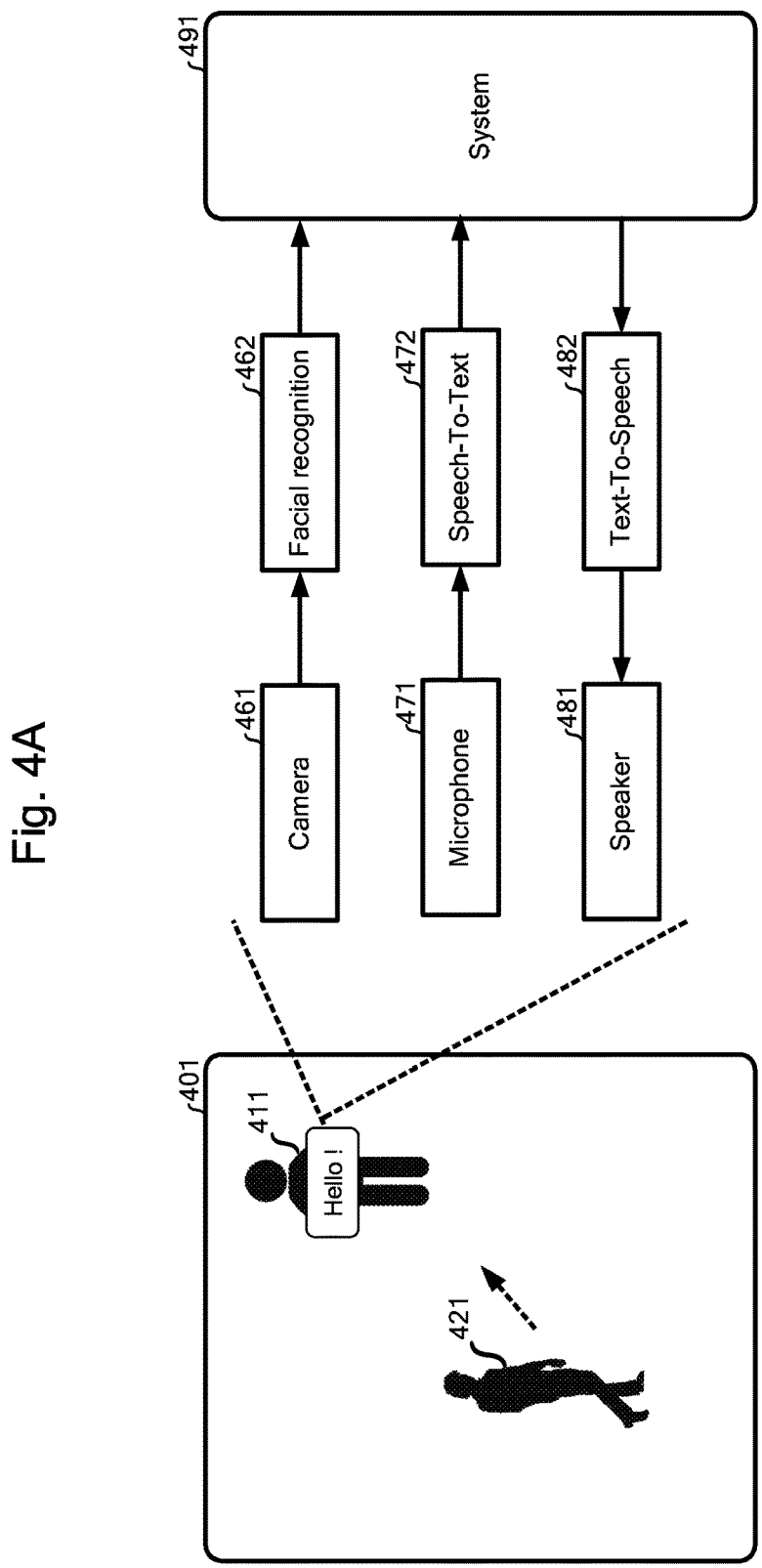

Fig. 7A

| Situation | Questioner and other users | Question | Prior Art | | One embodiment according to the present invention | |
|---|---|---|---|---|---|---|
| | | | Question to Classifier | Answer | Question to Classifier | Answer |
| A comes close and asks Question | A | "Can I get online information about your travel insurance?" | "Can I get online information about your travel insurance?" | "We provide information about our travel insurance on the internet" | "Can I get online information about your travel insurance?" | "We provide information about our travel insurance on the internet" |
| B and C come close, B steps in and asks Question | A,B,C | "Can you provide bodily damage coverage for car?" | "Can you provide bodily damage coverage for car?" | "Yes. We can provide bodily coverage option for your car insurance." | "Can you provide bodily damage coverage for car?" | "Yes. We can provide bodily coverage option for your car insurance." |
| B's friend C asks a consecutive question | A,B,C | "We need theft coverage for our baggage as well" | "Can you provide bodily damage coverage for car? We need theft coverage for our baggage as well" | "Yes. We can provide bodily coverage option for your car insurance." <=Wrong Answer | "Car Insurance We need theft coverage for our baggage as well" | "Yes. You can also add theft coverage for your car insurance ." <=Correct Answer |
| B and C leave and then A resumes Question | A | "Do you have options for flight delays?" | "We need theft coverage for our baggage as well. Do you have options for flight delays?" | "I am sorry I could not understand your question. Could you rephrase for me?" <=Confidence Score too low. | "Travel Insurance Do you have options for flight delays?" | "Yes. You can add flight delay option to your travel insurance." <=Correct Answer |

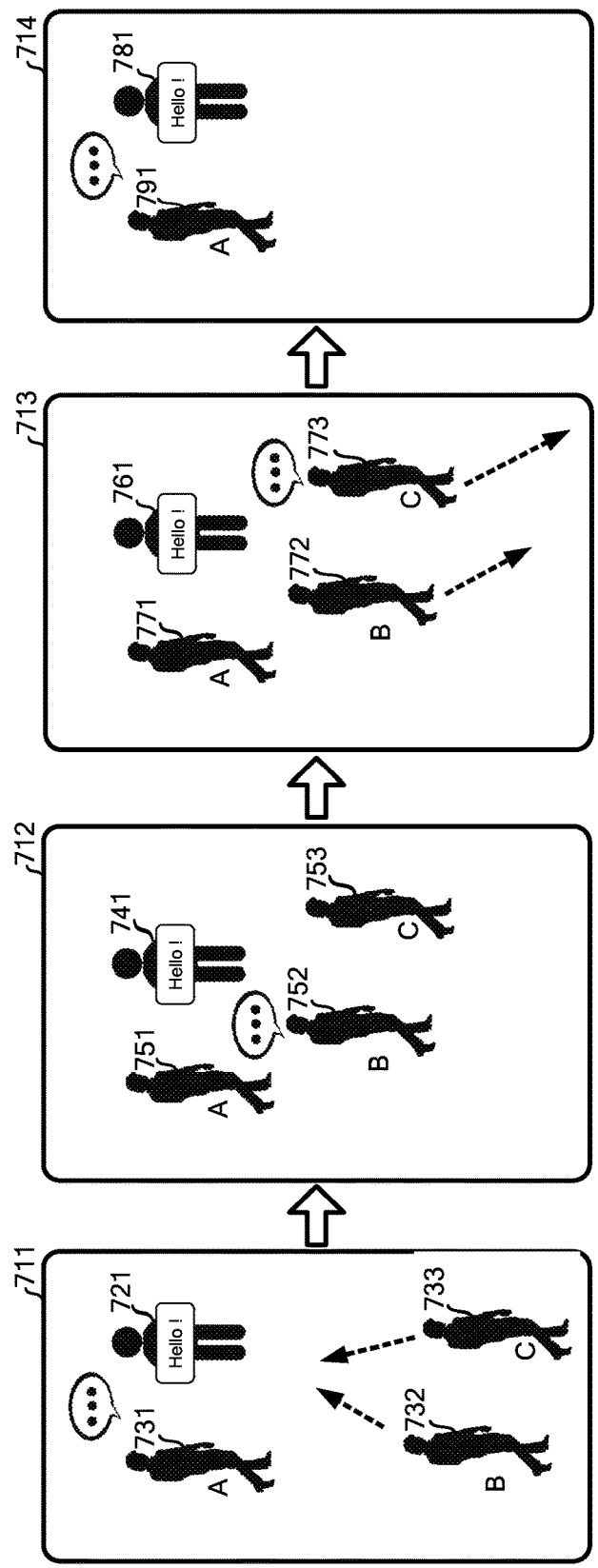

ANSWERING OF CONSECUTIVE QUESTIONS

BACKGROUND

Technical Field

The present invention generally relates to an answering of consecutive questions, and more particularly to an answering of consecutive questions in a single-user or multi-user situation.

Description of the Related Art

Recently, robots which can provide customer services are placed in stores. These robots can answer questions made by a customer, using a speech-to-text and text-to-speech technologies.

Recent technology advancements have resulted in high accuracy, to some extent, to a single question-answering.

The following Patent Literature [1] discloses robots and robotic systems for providing customer service within a facility (see [0005]).

The following Non-patent Literature [A] discloses 3D virtual humans and physical human-like robots can be used to interact with people in a remote location in order to increase the feeling of presence (see Abstract).

However, these literatures do not provide a technique for answering consecutive questions made not only by a single-user but also by multi-users with a high accuracy.

Patent Literature

[1] US 2016/0114488 A1

Non-Patent Literature

[A] Zerrin Yumak et. al., "Modelling Multi-Party Interactions among Virtual Characters, Robots, and Humans", Journal Presence: Teleoperators and Virtual Environments, Volume 23, Issue 2, pages 172 to 190, Spring 2014

SUMMARY

According to an aspect of the present invention, an embodiment of the present invention provides a computer-implemented method for answering consecutive questions, using a system which can access a database. The database has a hierarchical structure and each node in the hierarchical structure has a class label, one or more representative keywords, a question and an answer to the question.

In an embodiment, the method comprises the following: retrieving a questioner identifier associated with a questioner in response to receipt of a question from the questioner; obtaining, using the questioner identifier, a history on class labels which were assigned to questions made by the questioner in the past and choosing a class label among the class labels in the history; obtaining a list of keywords of the question and judging whether or not each keyword in the keyword list matches a representative keyword in any node among one or more nodes which exist in a hierarchy level in the database, or matches a synonym of the representative keyword; in a case where no match is found, obtaining one or more representative keywords which a node in the hierarchy level has and/or one or more synonyms of the representative keyword (hereinafter referred to as "one or more first representative keywords"), this node existing in a hierarchy upper relative to a node having the same class label as the class label which is chosen among the class labels in the history; adding the obtained one or more first representative keywords to the keyword list to generate a new question; inputting the received question and the new question in a classifier to obtain, from the classifier, a class label and its confidence score for each of the questions; selecting the class label which has a higher confidence score between or among the confidence scores; and finding, in the database, a node having the same class label as the selected class label and outputting an answer which the found node has.

In another embodiment, the method comprises the following: retrieving an identifier associated with a questioner (hereinafter also referred to as "a questioner identifier") and an identifier associated with each of one or more users who exist around the questioner (hereinafter also referred to as "a user identifier") in response to receipt of a question from the questioner; obtaining, using the questioner identifier, a history on class labels which were assigned to questions made by the questioner in the past (hereinafter also referred to as "a first history") and choosing a class label among the class labels in the first history (hereinafter also referred to as "a first class label"); for each of the user identifiers, obtaining, using the user identifier associated with the user, a history on class labels which were assigned to questions made by the user in the past (hereinafter also referred to as "a second history") and, for each of one or more second histories, choosing a class label among the class labels in the second history corresponding to the user (hereinafter also referred to as "a second class label"); obtaining a list of keywords of the question and judging whether or not each keyword in the keyword list matches a representative keyword in any node among one or more nodes which exist in a hierarchy level in the database, or matches a synonym of the representative keyword; in a case where no match is found, obtaining one or more representative keywords which a node in the hierarchy level has and/or one or more synonyms of the representative keyword (hereinafter also referred to as "first representative keywords"), this node existing in a hierarchy upper relative to a node having the same class label as the first class label; and obtaining one or more representative keywords which a node in the hierarchy level has and/or one or more synonyms of the representative keywords (hereinafter also referred to as "second representative keywords"), this node existing in a hierarchy upper relative to a node having the same class label as the second class label; adding the one or more first representative keywords to the keyword list to generate a new first question and adding the one or more second representative keywords to the keyword list to generate a new second question; inputting the received question, the new first question and the new second question in a classifier to obtain, from the classifier, a class label and its confidence score for each of the questions; selecting the class label which has a higher confidence score among the confidence scores; and finding, in the database, a node having the same class label as the selected class label and outputting an answer which the found node has.

According to another aspect of the present invention, a system, such as a computer system, comprising a processor and a memory storing a program of instructions executable by the processor to perform one or more methods described herein may be provided.

According to another aspect of the present invention, a computer program product comprising a computer readable storage medium storing a program of instructions executable by a system to perform one or more methods described herein also may be provided.

According to an embodiment of the present invention answer to each of the consecutive questions made by a single-user can be obtained with a high accuracy, using a questioner identifier and a database having a hierarchical structure.

According to an embodiment of the present invention the hierarchical structure having n hierarchy levels is used and, therefore, an accuracy of obtaining the answer can be further improved.

According to an embodiment of the present invention a history on class labels which were assigned to questions made by the questioner in the past can be dynamically updated.

According to an embodiment of the present invention answer to each of the consecutive questions made by multi-users can be obtained with a high accuracy, using a questioner identifier, one or more user identifiers and a database having a hierarchical structure.

According to an embodiment of the present invention the hierarchical structure having n hierarchy levels is used and, therefore, an accuracy of obtaining the answer can be further improved.

According to an embodiment of the present invention a first history on class labels which were assigned to questions made by the questioner in the past can be dynamically updated.

According to an embodiment of the present invention a second history on class labels which were assigned to questions made by the user in the past, the user existing around the questioner, can be dynamically updated.

According to an embodiment of the present invention answer to each of the consecutive questions made by a single-user can be obtained with a high accuracy, using a questioner identifier and a database having a hierarchical structure.

According to an embodiment of the present invention answer to each of the consecutive questions made by multi-users can be obtained with a high accuracy, using a questioner identifier, one or more user identifiers and a database having a hierarchical structure.

According to an embodiment of the present invention the hierarchical structure having n hierarchy levels is used and, therefore, an accuracy of obtaining the answer can be further improved.

According to an embodiment of the present invention answer to each of the consecutive questions made by a single-user can be obtained with a high accuracy, using a questioner identifier and a database having a hierarchical structure.

According to an embodiment of the present invention the hierarchical structure having n hierarchy levels is used and, therefore, an accuracy of obtaining the answer can be further improved.

According to an embodiment of the present invention answer to each of the consecutive questions made by a single-user can be obtained with a high accuracy, using a questioner identifier, one or more user identifiers and a database having a hierarchical structure.

According to an embodiment of the present invention the hierarchical structure having n hierarchy levels is used and, therefore, an accuracy of obtaining the answer can be further improved.

BRIEF DESCRIPTION OF THE DRAWINGS

FIGS. 2A to 2C illustrate flowcharts for an embodiment of a process for answering consecutive questions made by a single user;

FIGS. 3A to 3E illustrate flowcharts for an embodiment of a process for answering consecutive questions made by multi-users;

FIG. 4A illustrates one embodiment of an exemplified diagram of detecting and identifying single-user and detecting conversations made by the single-user and of a speech-to-text and text-to-speech technologies;

FIG. 7A illustrates one embodiment of answers obtained according to a prior art and one embodiment according to the present invention;

FIG. 7B illustrates one embodiment of an exemplified diagram of multi-users corresponding to a situation described in FIG. 7A.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the exemplified definitions are provided hereinafter, but the meaning of the terms should be interpreted broadly as known to the technical field to which the present invention relates.

The term, "a questioner", may refer to, for example, but not limited to, a person or computer who asks a question.

Figure 1:
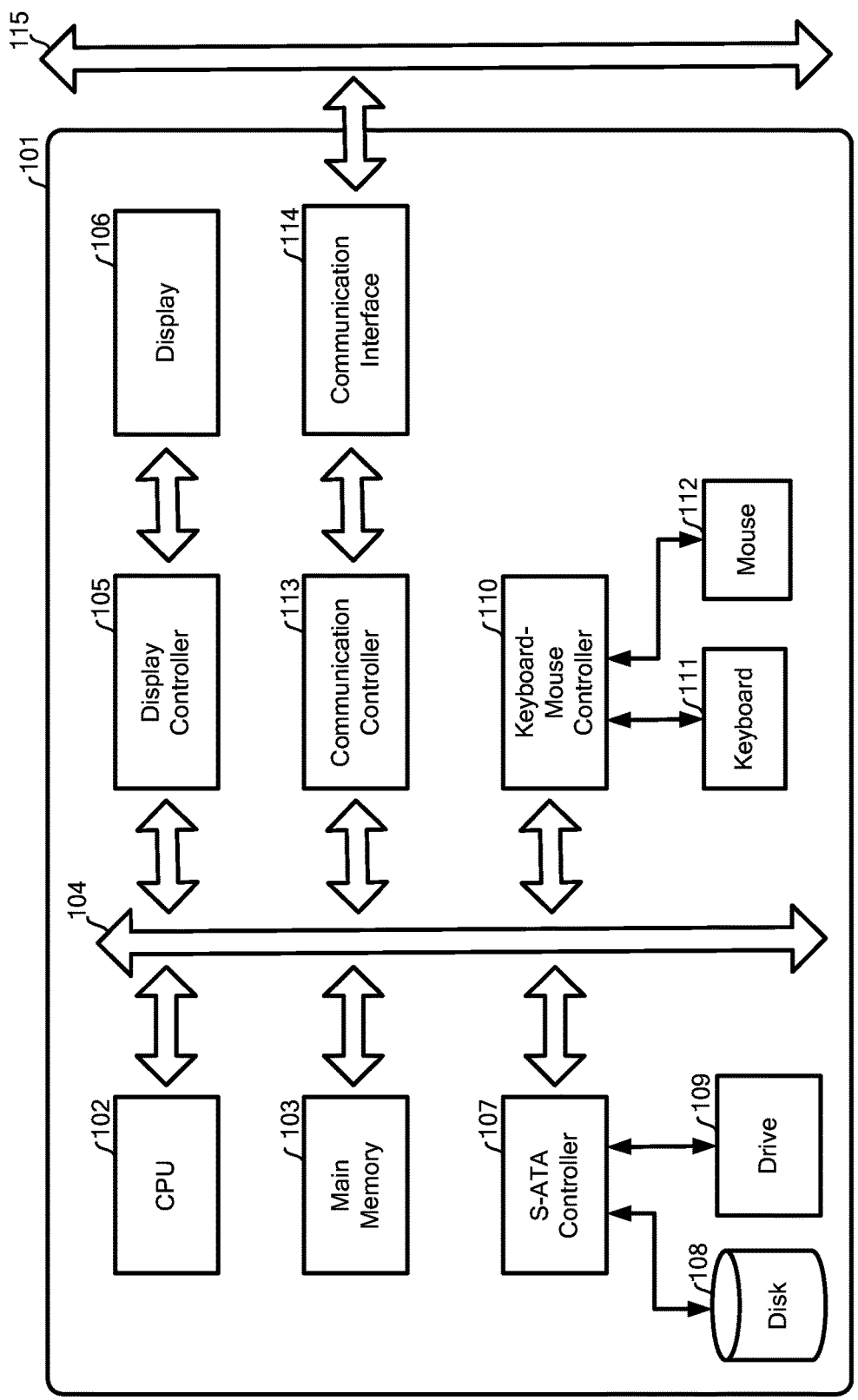
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both;"Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2A to 2C, FIGS. 3A to 3E, FIGS. 4A and 4B, FIG. 5, FIGS. 6A and 6B, FIGS. 7A and 7B, and FIG. 8.

The idea of an embodiment of the present invention is on the basis of the following perceptions.

As stated above, recent technology advancements have resulted in high accuracy to single question-answering. However, there are still problems for answering consecutive questions made by a single user.

The robots which can provide customer services are still expensive. Accordingly, it is required that the robots can handle multiple customers at the same time and handle consecutive questions made by each of the multiple customers.

However, there still remains huge technical challenges for handling multiple customers at the same time (multi-users) and handling consecutive questions made by each of the multiple customers (multi-contexts), due to the problems mentioned below:

Problem A: Multi-users for the robot; Customers will move freely in and out of a robot for providing customer services, ask questions of various context and receive answers from the robot. In other words, a set of customers will be continuously changed around the robot and, therefore, the robot needs to dynamically adapt to single-user or multi-users situations.

Problem B: The prior art for the established session: For situations outside of the robot such as a chat system or call center, each customer is precisely associated with established sessions. In such a case, it is known that, by a method for appending a current question to a prior question, the context will not be lost. However, in a situation that the context is changing by consecutive questions, it has no measures to cope with the changes in the method for appending a current question to a prior question. Specifically, it cannot take into consideration that a context of hierarchical layers (or levels) such as an upper, medium, or lower, or what/how/recommend layers (or levels) changes. Further, keywords which are irrelevant to a knowledge database can cause a degradation of answer accuracy. An example of a method for appending a current question to a prior question will be explained in FIG. 7A as the prior art.

Problem C: Multi-users and multi-contexts: Let us suppose the following two cases. (1) In a case where a question is made by questions previously made by his or her friend's, a customer asks questions based on answers obtained from questions previously made by the friend. Accordingly, it is required to identify each of the multi-users in multi-users situations and answer the consecutive questions made by multi-users. (2) In a case where a question is made by his or her own previous questions, a customer asks questions relating to his or her previous questions, based on his or her own interest, which questions are irrelevant of questions previously made by other customers.

Accordingly, it is required to cope with those problems.

In the following explanations, the following two situations are considered: consecutive questions are made by a single user or multi-users. An embodiment of a flowchart of a process for answering consecutive questions made by a single user and multi-users will be explained in FIGS. 2A to 2C and FIGS. 3A to 3E, respectively.

With reference now to FIGS. 2A to 2C, FIGS. 2A to 2C illustrate one embodiment of a flowchart of a process for answering consecutive questions made by a single user.

Let us suppose that an answering machine such as a robot which can provide customer services is placed in a certain place and a person who is a questioner is now standing at the front of the answering machine. The answering machine can communicate with a system via, for example, an internet or an intranet.

The system such as the computer (101) performs each of the steps described in each of FIGS. 2A to 2C. The system may be implemented as a single computer or a plurality of computers.

The answering machine may detect a person who is now coming close to the answering machine, using one or more video cameras, one or more sensors such as an infrared sensor, or a microphone or microphone arrays. Any technique known in the art for detecting a person can be used herein.

Further, the answering machine may identify a person, using biometric information which may be taken by the video camera. The biometric information may be, for example, but not limited to, facial or iris information. Any technique known in the art for identifying the person, such as facial or iris recognition techniques can be used herein. The biometric information may be used for retrieving a questioner identifier mentioned in step 203 of FIG. 2A mentioned below.

Further, the answering machine may receive a conversation made by the person, using the microphone and then convert the conversation to a text data, using an A/D converter and a speech recognition technique. The obtained text data is associated with a timestamp which may indicate a time to receive the conversation. Any A/D converter and any speech recognition technique known in the art for detecting a conversation can be used herein. The conversation may be a question made by a person.

An embodiment of detecting and identifying a person and detecting a conversation made by the person will be explained by referring to FIG. 4A mentioned below.

With reference now to FIG. 4A, FIG. 4A illustrates one embodiment of an exemplified diagram of detecting and identifying single-user and detecting speech made by the single-user.

The diagram (401) shows that a person (421) is now coming close to an answering machine (411) such as a robot with which a camera (461) such as a video camera or a sensor (not shown) and a microphone or microphone arrays (471) are equipped.

The answering machine (411) may detect the person (421), using photo or movie data taken by one or more cameras (461); one or more sensors; or a microphone or microphone arrays. In response to the detection of the person (421), the answering machine (411) may obtain facial information from the photo or movie data and then identify the person (421), using the facial information. The identification can be done by a facial recognition section (462) in which a user identification can be done according to the technique known in the art. Alternatively, in response to the detection of the person (421), the answering machine (411) may send the photo or movie data or facial information to the system (491) in order to identify the person (421) on the system (491).

The answering machine (411) may receive a conversation made by the person (421) on the microphone or microphone arrays (471). In response to the receipt of the conversation, the answering machine (411) may convert the conversation (or audio) to an audio data, using an A/D converter, generate a text data from the audio data, using a speech-to-text section (472) in which the conversion of the audio data to the text data can be done according to the technique known in the art, and then transfer the text data to the system (491). The speech-to-text section (472) may optionally omit noises and returns only the valid portion of the conversation. Further, speech-to-text section (472) may optionally truncate a portion of the conversation in a real time recognition. Alternatively, in response to the receipt of the conversation, the answering machine (411) may convert the conversation (or audio) to an audio data, using an A/D converter, and then transfer the audio data to the system (491) in order to generate the text data from the audio data on the system (491).

With reference now to FIG. 2A, in step 201, the system starts the process for answering consecutive questions.

In step 202, the system receives a question from the questioner. The system may receive the question in a form of a text data or an audio data. In a case where the system receives the question in a form of the audio data, the system generates the text data from the audio data, using a speech-to-text technology.

In step 203, the system judges whether a questioner identifier associated with the questioner is found in a storage, such as a list or database, for storing one or more sets of a questioner identifier and biometric information on a questioner associated with questioner identifier (hereinafter also referred to as "questioner list").

The questioner identifier may refer to an identifier uniquely associated with one person. Accordingly, in a case where a questioner is identified using the biometric information, the questioner identifier can be retrieved, using the biometric information on a questioner associated with the questioner identifier.

In a case where it is the first time for the questioner to ask the question, it is likely that the questioner identifier may not be found in the questioner list. Meanwhile, in a case where it is the second or more time for the questioner to ask the question, the questioner identifier may be found in the questioner list.

If the judgment is positive, the system proceeds to step 204. Meanwhile, if the judgment is negative, the system proceeds to step 208.

In step 204, the system retrieves, in the questioner list, the questioner identifier associated with the questioner.

In step 205, the system obtains, using the questioner identifier, a history on class labels which were assigned to questions made by the questioner in the past.

The history may be, for example, but not limited to, in a form of a database for storing questioner context information (hereinafter also referred to as "questioner context database"). The history may store the following information: a questioner identifier and a history of record which is associated with the questioner identifier. The history of record may include, for each a questioner identifier, one or more sets of a class label and a time stamp. Alternatively, the history of record may be generated for each of the questioner identifiers and each of the history of records may include one or more sets of a class label and a time stamp.

The class label may refer to a name uniquely assigned to each node in a hierarchical structure which is had by a database having a hierarchical structure (hereinafter also referred to as "hierarchical structure database"), which will be detailed explained below by referring to FIGS. 6A and 6B.

The timestamp may refer to a time when the answering machine receives the question from the questioner.

The history can be dynamically generated by the system, as seen in step 221 described in FIG. 2B mentioned below.

In step 206, the system chooses a class label among the class labels in the history. The system may choose, among the class labels in the history, a class label assigned to a question which was made just before the received question, using the timestamp. The question identifier obtained from step 204 or 207 and the chosen class label is used in the following steps.

In step 207, the system assigns a questioner identifier to the questioner. The system may further choose a default class label which is in advance determined by an operator or administrator of a system according to an embodiment of the present invention. The default class label is chosen from that assigned to any node in the hierarchical structure database.

In step 208, the system obtains a list of keywords of the question in a case where the system does not have the list of keywords yet. The list of keywords may be received from the answering machine at the time when the system receives the question from the answering machine, or may be generated during steps 202 to 207 from the text data which was generated from the question.

The list of keywords may be generated, using a natural language processing which is known in the art. For example, in a case where a speech is made by English, a morphological analysis is not required. Meanwhile, for example, in a case where a speech is made by Japanese, a morphological analysis is required.

The list of keywords may include a part or all result of the natural language processing.

In a case where the list of keywords may include a part of the natural language processing, the list of keywords may include a noun, an adjective, an adverb or a combination of these.

In step 208, the system further judges whether or not each keyword in the keyword list matches a representative keyword in any node among one or more nodes which exist in a hierarchy level in the database, or matches a synonym of the representative keyword.

The hierarchical structure database may be, for example, but not limited to, in a form of a knowledge database. The hierarchical structure database has a hierarchical structure and one or more nodes. The hierarchical structure may have n hierarchy levels, where n is an integer of at least one. Each node in the hierarchical structure has a class label, one or more representative keywords, a question and an answer to the question.

For the class label, the definition mentioned above is applied here.

The representative keyword may refer to a keyword assigned to each of the nodes.

Each node has one or more representative keyword. Further, for each node, a synonym of the representative keyword may be optionally associated with the representative keyword. Each node may have a synonym or have a link to access or obtain the synonym.

Each node has a set of a question and an answer to the question.

The hierarchical structure database may be in advance generated by an operator or administrator of a system according to an embodiment of the present invention.

An embodiment of the hierarchical structure database will be explained by referring to FIGS. 6A and 6B mentioned below.

Figure 6A:
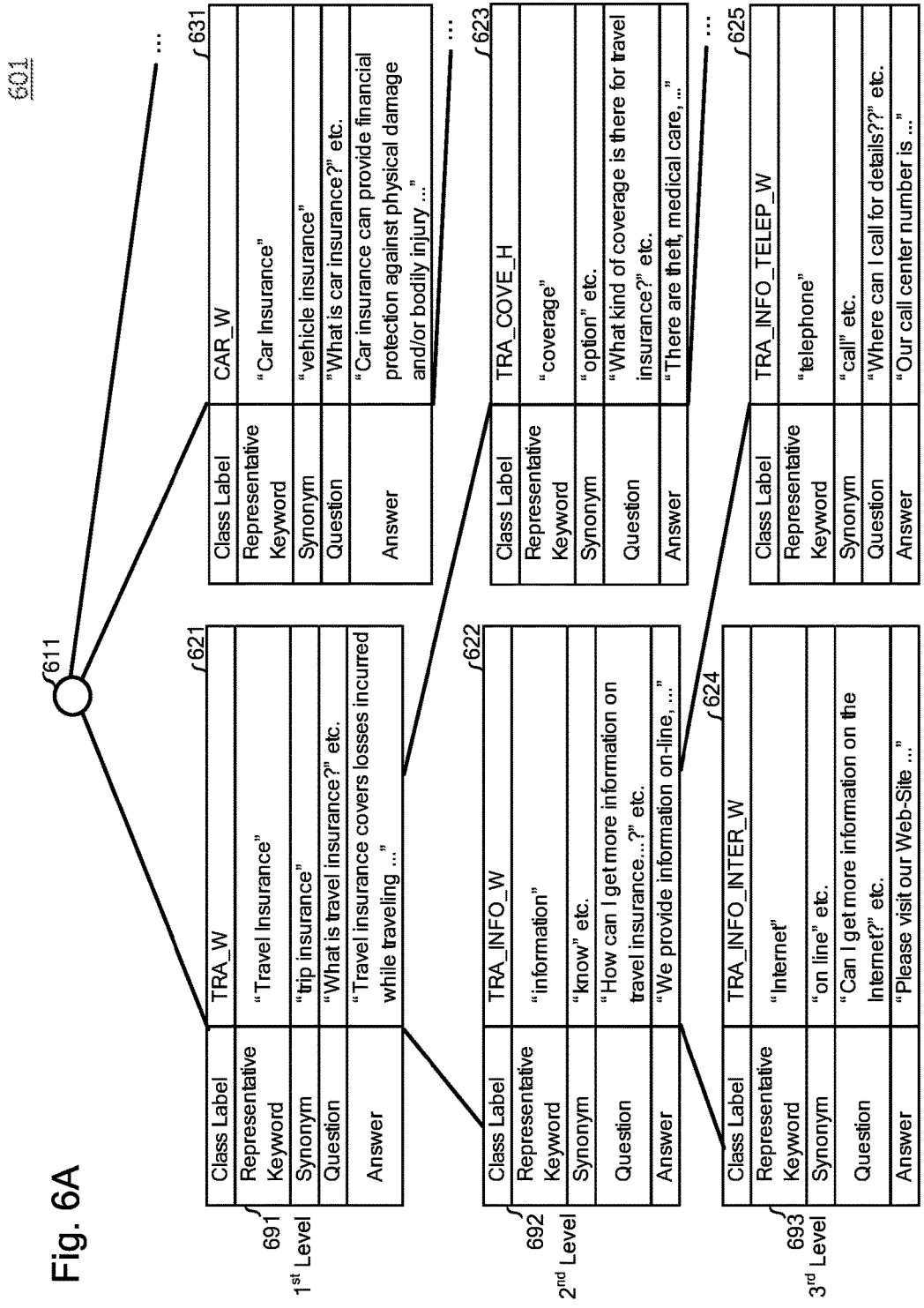
FIGS. 6A and 6B illustrate one embodiment of a database having a hierarchical structure.

With reference now to FIG. 6A, FIG. 6A illustrates one embodiment of a hierarchical structure database.

FIG. 6A shows a part of the hierarchical structure database (601).

The hierarchical structure database (601) may have a top node (611) which is the top of the hierarchical structure and does not have any parent node, and a plurality of nodes (621, 622, 623, 624, 625 and 631). The plurality of nodes (621, 622, 623, 624, 625 and 631) may be divided into n hierarchy levels, where n being an integer of at least one. The top node (611) has two children nodes (621 and 631) and is connected to these children nodes (621 and 631). These nodes (621 and 631) occupy the first hierarchy level of the hierarchical structure. The node (621) in the first hierarchy level (691) has two children nodes (622 and 623) and is connected to these children nodes (622 and 623). These nodes (622 and 623) occupy the second hierarchy level (692) of the hierarchical structure. The node (622) in the second hierarchy level has two children nodes (624 and 625) and is connected to these children nodes (624 and 625). These nodes 624 and 625) occupy the third hierarchy level (693) of the hierarchical structure.

Each of the nodes (621, 622, 623, 624, 625 and 631) has the following: a class label, a representative keyword, a synonym of the representative keyword, a question and an answer to the question.

In one embodiment, each of the class labels may be named so as to represent a hierarchy level for the hierarchical structure.

For example, each of the class labels of the nodes (621, 622, 623, 624 and 625) commonly has the term, "TRA". In the first hierarchy level (691), the node (621) has the common term, "TRA", and the term "W" which refer to "What". In the second hierarchy level (692), the node (622) has the term, "TRA" which is had by the parent node (621), the term, "INFO", and the term "W" mentioned above; and the node (622) has the term, "TRA" which is had by the parent node (621), the term, "PURC", and the term "W" mentioned above. In the third hierarchy level (693), the node (624) has the term, "TRA_INFO" which is had by the parent node (622), the term, "INTER", and the term "W" mentioned above; and the node (625) has the term, "TRA_INFO" which is had by the parent node (622), the term, "TELEP", and the term "W" mentioned above.

Figure 6B:
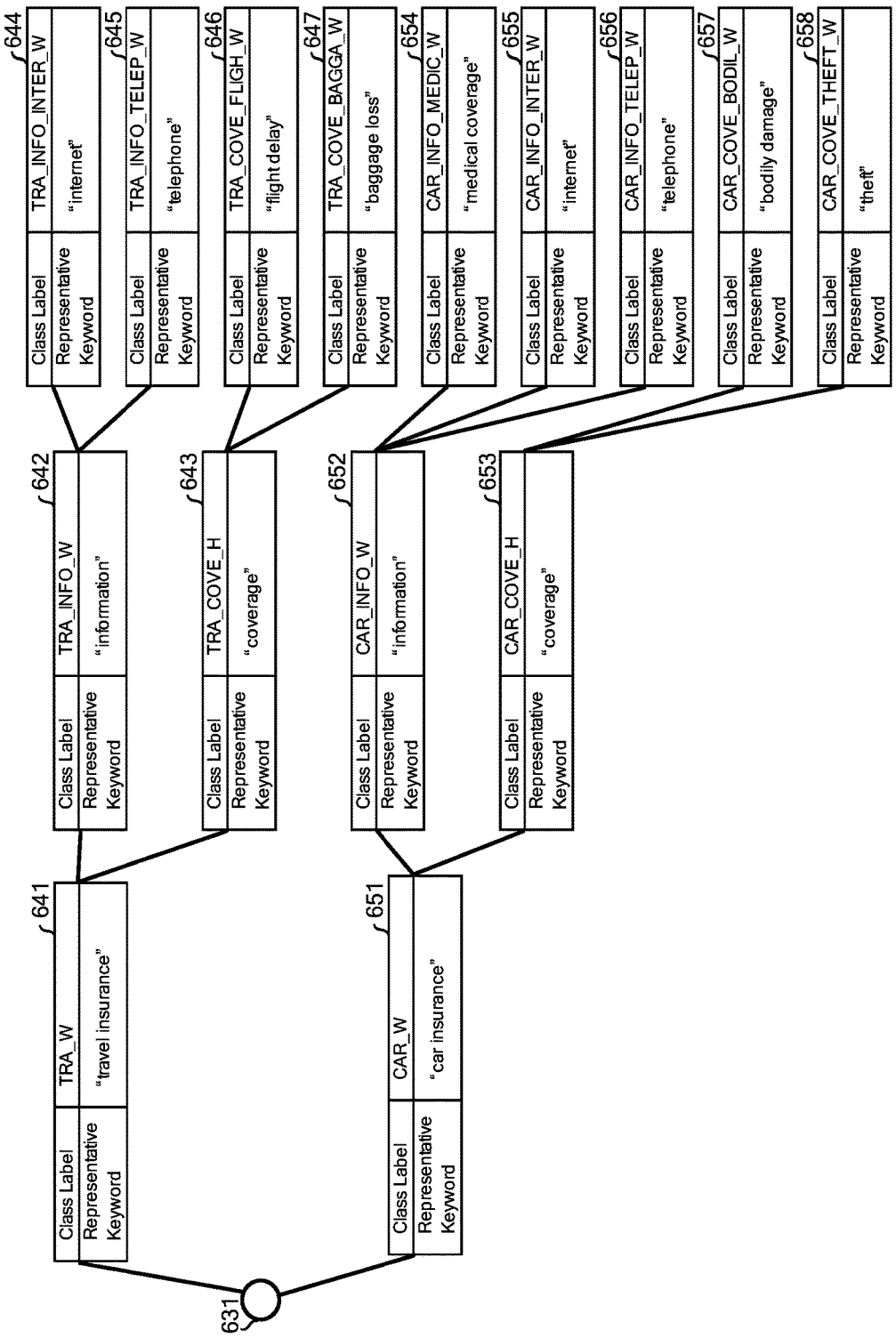

With reference now to FIG. 6B, FIG. 6B illustrates one embodiment of a hierarchical structure database including the nodes described in FIG. 6A. The nodes (641, 642, 643, 644, 645, 643 and 651) described in FIG. 6B correspond to the nodes (621, 622, 623, 624, 625 and 631) described in FIG. 6A, respectively. In FIG. 6B, the class label and a representative keyword are only shown in each of the nodes (641 to 647 and 651 to 658), but each of the nodes (641 to 647 and 651 to 658) has a question and an answer to the question, and optionally a synonym of the representative keyword.

With reference now back to FIG. 2A, one embodiment of the judgment described in step 208 will be explained below by referring to FIG. 2C.

With reference now to FIG. 2C, in step 231, the system starts the process for the judgment described in step 208.

In step 232, the system sets a current hierarchy level to an upper level (or the first hierarchy level in the hierarchical structure: in a first cycle). The system may prepare a memory space for storing the current hierarchy level, hierlvl.

In step 233, the system judges whether or not a keyword in the keyword lists matches a representative keyword in any node among one or more nodes which exist in the n-th hierarchy level (or the first hierarchy level in the hierarchical structure: in the first cycle), or matches a synonym of the representative keyword.

The judgment is done using the hierarchical structure database. In one embodiment, the judgment is done, starting at the first hierarchy level and moving to a lower level until the match is found. In another embodiment, the judgment is done, using a class label which is a name uniquely assigned to each node in a hierarchical structure and to which the name is uniquely assigned so as to represent a hierarchy level for the hierarchical structure. In the latter case, there is no need to judge by starting at the first hierarchy level and moving to a lower level until the match is found.

In step 234, if the judgment is positive, the system proceeds to step 238 in order to output the saved keyword(s). Meanwhile, if the judgment is negative, the system proceeds to step 235.

In step 235, the system obtains one or more representative keywords which a node in the present hierarchy level has and/or the synonym of the representative keyword, where this node exists in a hierarchy upper relative to a node having the same class label as the class label which is chosen among the class labels in the history, and then save, into the keyword list, the obtained one or more representative keywords or the obtained synonym. The obtained one or more representative keywords are in the node having the n-th hierarchy level. Further, in a case where the hierarchical structure database has a synonym, the obtained one or more synonyms are in the node having the n-th hierarchy level.

In step 236, the system judges whether or not there is a next lower hierarchy level (or the second hierarchy level in the hierarchical structure: in the first cycle). If the judgment is positive, the system proceeds to step 237. Meanwhile, if the judgment is negative, the system proceeds to step 238 in order to output the saved keyword(s).

In step 237, the system sets the current hierarchy level to a next lower level (or the second hierarchy level in the hierarchical structure: in the first cycle). After then, the system repeats steps 233 to 237, until the judgment is positive in step 234 or the judgment is negative in step 236.

In step 238, the system outputs the saved keyword(s).

In step 239, the system terminates the process for the judgment described in step 208.

With reference now to FIG. 2B, in step 209, the system obtains one or more representative keywords which a node in the hierarchy level has and/or one or more synonyms of the representative keyword (hereinafter, the obtained one or more representative keywords and/or the obtained one or more synonyms are totally referred to as "one or more first representative keywords"), where this node exists in a hierarchy upper relative to a node having the same class label as the class label which is chosen among the class labels in the history. Alternatively, in a case where the process described in FIG. 2C is done, the system may read the keyword(s) which was output in step 238 described in FIG. 2C.

In step 216, the system adds the obtained one more first representative keywords to the keyword list to generate a new question. In a case where the process described in FIG. 2C is done, the one or more first representative keywords are combined each other to generate a combined keyword, and the combined keyword is added to the keyword list to generate a new question.

In step 217, the system inputs the question received in step 202 described in FIG. 2A and the new question(s) generated in step 216 in a classifier and obtains, from the classifier, a class label and its confidence score for each of the questions. The classifier returns one or more sets of a class label and its confidence score.

The classifier used is in advance trained using sets of a class label and a question.

Any classifier known in the art can be used herein. For example, the classifier may IBM® Watson™ Natural Language Classifier on cloud base such as Bluemix® can be used.

In step 218, the system selects the class label which has a higher confidence score between or among the confidence scores.

In step 219, the system finds, in the hierarchical structure database, a node having the same class label as the selected class label.

In step 220, the system outputs an answer which the found node has. The system may transfer the output answer to the answering machine. The answering machine may perform a speech output or screen output of the answer, using the output answer.

In step 221, the system stores, in the history, the selected class label and the time stamp, for example, using the questioner identifier. Accordingly, the history can be dynamically updated. The storing can be performed after the selection of class label described in step 218.

In step 222, the system terminates the process, for example, at the time when the questioner leaves an area which can be detectable by the answering machine.

With reference now to FIGS. 3A to 3E, FIGS. 3A to 3E illustrate one embodiment of a flowchart of a process for answering consecutive questions made by multi-users.

Let us suppose that an answering machine such as a robot which can provide customer services is placed in a certain place and a plurality of persons is now standing at the front of the answering machine. The answering machine can communicate with a system via, for example, an internet or an intranet.

The system such as the computer (101) performs each of the steps described in each of FIGS. 3A to 3E. The system may be implemented as a single computer or a plurality of computers.

The answering machine may detect a plurality of persons who are now coming close to the answering machine, using one or more video cameras, one or more sensors such as an infrared sensor, or a microphone or microphone arrays. Any technique known in the art for detecting a plurality of persons can be used herein.

Further, the answering machine may identify each of a plurality of persons, using biometric information which may be taken by the video camera, as stated above. The biometric information may be used for retrieving a questioner identifier mentioned in step 303 of FIG. 3A mentioned below.

Further, the answering machine may receive a conversation made by the person, using the microphone and then convert the conversation to a text data, using an A/D converter and a speech recognition technique, as stated above. The answering machine may identify a person who is now speaking or who spoke, using a speech recognition technique. Any A/D converter and any speech recognition technique known in the art for detecting a conversation can be used herein. The conversation may be a question made by a person.

An embodiment of detecting and identifying a plurality of persons and detecting a conversation made by a person among the persons will be explained by referring to FIG. 4B mentioned below.

Figure 4B:
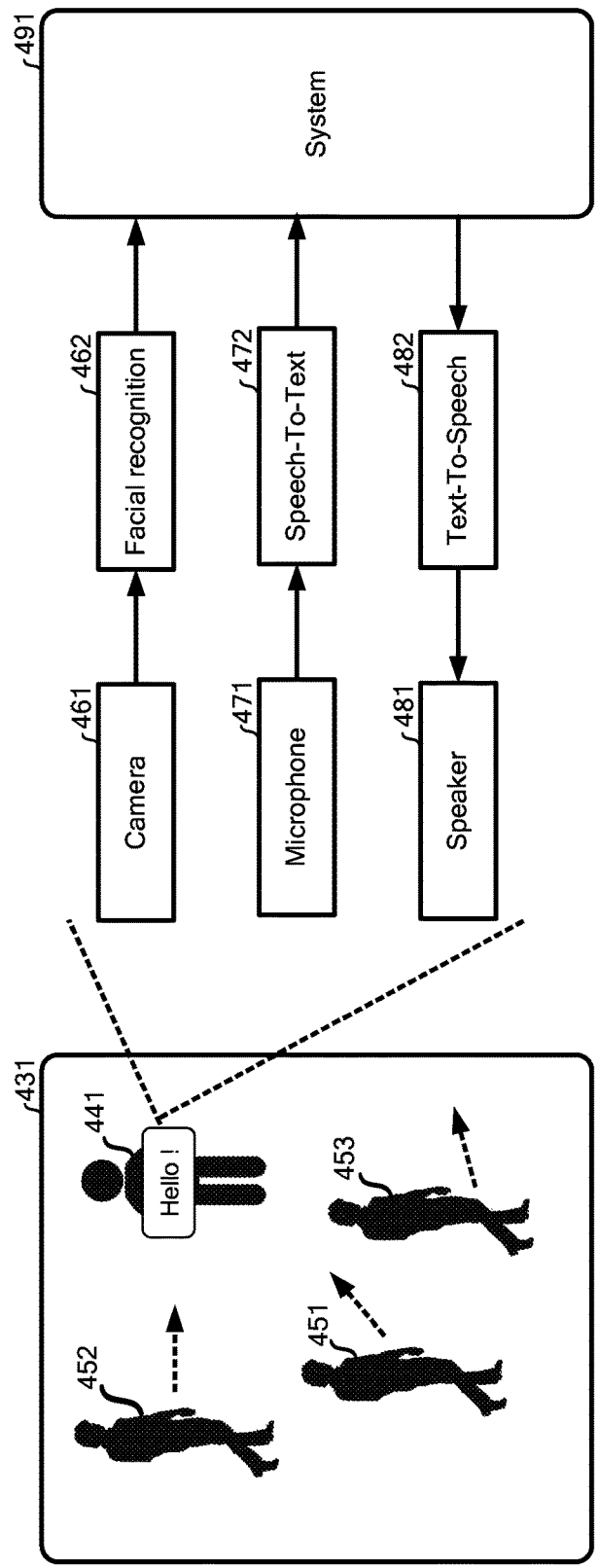
FIG. 4B illustrates one embodiment of an exemplified diagram of detecting and identifying multi-users and detecting conversations made by the multi-users and of a speech-to-text and text-to-speech technologies.

With reference now to FIG. 4B, FIG. 4B illustrates one embodiment of an exemplified diagram of detecting and identifying multi-users and detecting speech made by the multi-users.

The diagram (431) shows that three persons (451,452 and 453) are now simultaneously or separately coming close to a robot (441) with which a camera (461) such as a video camera or a sensor (not shown) and a microphone or microphone arrays (471) are equipped.

The answering machine (441) may detect each of the persons (451,452 and 453), using photo or movie data taken by one or more cameras (461); one or more sensors; or a microphone or microphone arrays. In response to the detection of each of the persons (451,452 and 453), the answering machine (441) may obtain facial information from the photo or movie data and then identify each of the persons (451,452 and 453), using the facial information. The identification can be done by a facial recognition section (462) in which a user identification can be done according to the technique known in the art. Alternatively, in response to the detection of each of the persons (451,452 and 453), the answering machine (441) may send the photo or movie data or facial information to the system (491) in order to identify each of the persons (451,452 and 453) on the system (491).

The answering machine (431) may receive a conversation made by any of the persons (451,452 and 453) on the microphone or microphone arrays (471). In response to the receipt of the conversation, the answering machine (431) may convert the conversation (or audio) to an audio data, using an A/D converter, generate a text data from the audio data, using a speech-to-text section (472) in which the conversion of the audio data to the text data can be done according to the technique known in the art, and then transfer the text data to the system (491). The speech-to-text section (472) may optionally omit noises and returns only the valid portion of the conversation. Further, speech-to-text section (472) may optionally truncate a portion of the conversation in a real time recognition. Alternatively, in response to the receipt of the conversation, the answering machine (431) may convert the conversation (or audio) to an audio data, using an A/D converter, and then transfer the audio data to the system (491) in order to generate the text data from the audio data on the system (491).

The answering machine (431) may associate the conversion with a person among the (451,452 and 453) to identify the questioner.

An embodiment of identifying each of the persons including a questioner and one or more users who exist around the questioner will be explained by referring to FIG. 5 mentioned below.

Figure 5:
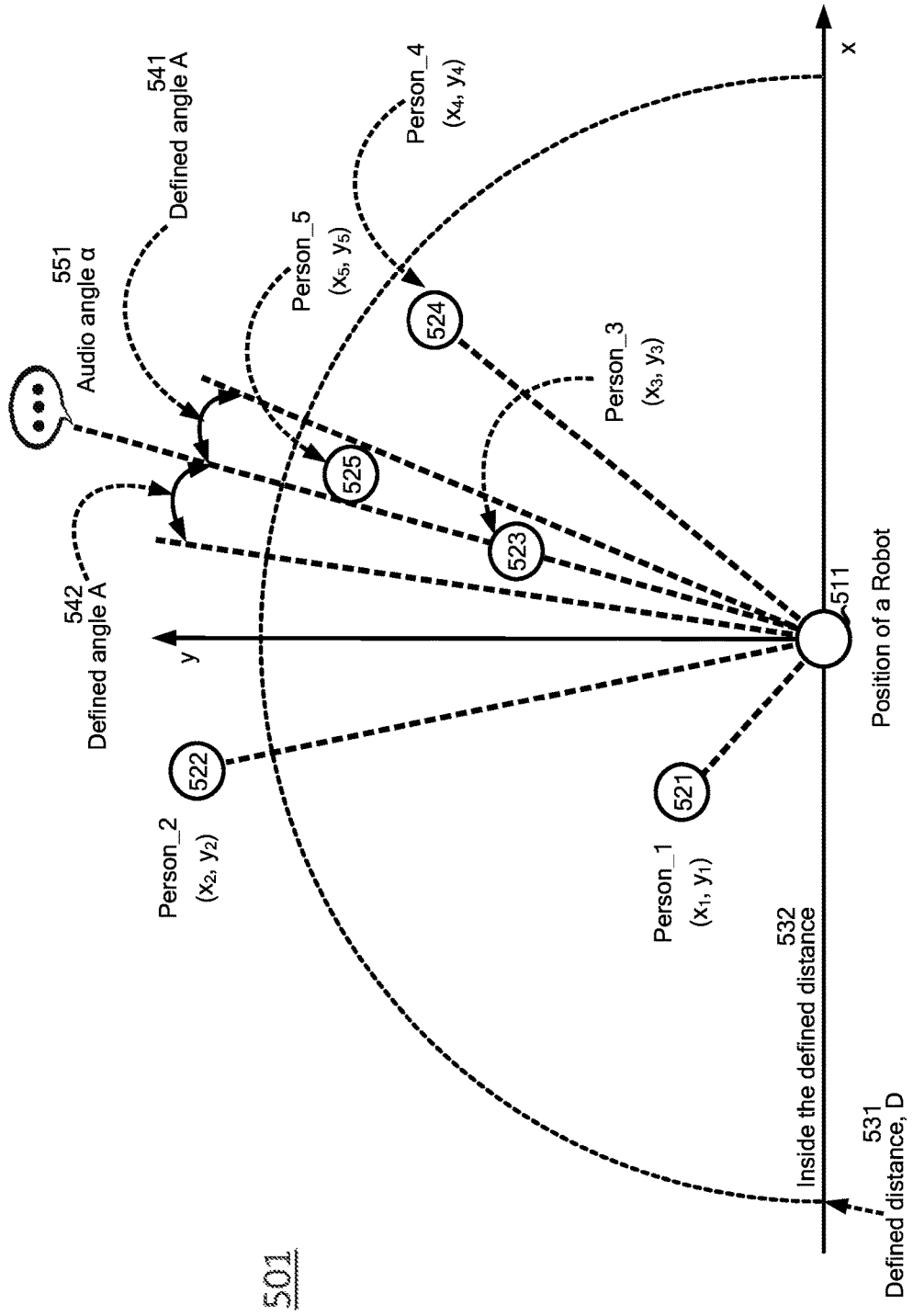
FIG. 5 illustrates one embodiment of an exemplified diagram of identifying multi-users including a questioner and one or more users who exist around the questioner.

With reference now to FIG. 5, FIG. 5 illustrates one embodiment of an exemplified diagram of identifying multi-users including a questioner and one or more users who exist around the questioner.

The diagram (501) shows an answering machine (511) such as a robot and the following five persons: Person_1 (521), Person_2 (522), Person_3 (523), Person_4 (524) and Person_5 (525).

A questioner and the users who exist around the questioner among the five Persons_1 to 5 (521 to 525) are determined as follows.

Each person identifier (person identifiers including a questioner identifier and one or more user identifiers) and a position list can be obtained from a facial recognition. Further, an audio angle can be obtained from a speech-to-text section (see 472 in FIG. 4B) using a microphone array (471). However, the audio angle may not provide a distance between the answering machine (511) and each of Persons_1 to 5 (521 to 525). Accordingly, the questioner can be determined according to the closeness of the audio angle and the shortest distance among the distances between the answering machine (511) and each of Persons_1 to _5 (521 to 525). The details of determination of the questioner are as follows.

Coordinates x, y of each person identifier $l_i$ in a person list L_all may be given.

$$l_i = \{l_{ix}, l_{iy}\}$$

$$L\_all = \{l_1, l_2, \ldots, l_n\}$$

A distance of each elements $l_i$ can be calculated by a distance($l_i$). An angle can be calculated by angle($l_i$).

$$distance(l_i) = \sqrt{l_{ix}^2 + l_{iy}^2}$$

$$angle(l_i) = \text{Arc Tan}(l_{ix}, l_{iy}) * 180/\pi$$

First, of all person list, L_all, the candidate of a user(s) who exists around the questioner L_rgcan may be determined when their distance is within the defined distance D(531).

$$L\_rgcan = \{L_{13} \text{ rgcan}_j \in L\_all | distance(L\_rgcan_j) \leq D\}$$

Next, the questioner candidate L_spcan is of the user L_rgcan which the audio angle a (551) (given by the microphone array) when their absolute value of difference abs( ) is within the defined angle A (541 and 542).

$$L\_spcan = \{L\_spcan_k \in L\_rgcan | abs(L\_spcan_k) - \alpha) \leq A\}$$

In this case, Questioner $l_s$ is determined as, of all the L_spcan$_k$ which consist of L_spcan, which is the shortest distance.

$$\text{Questioner } l_s = \text{argmin}_k(distance(L\_spcan_k))$$

Finally, user list L_range is, of each element L_rgcan$_m$ which consist of L_rgcan, the one which is not Questioner $l_s$.

$$\text{user list } L\_range = \{(L\_range_m \in L\_rgcan | L\_range_m \neq l_s)\}$$

In the diagram (501), L_spcan=$\{l_3, l_5\}$ and a questioner is determined as $l_3$, and the users who exist around the questioner is determined as L_range=$\{l_1, l_4, l_5\}$.

With reference now to FIG. 3A, in step 301, the system starts the process for answering consecutive questions.

In step 302, the system receives a question from the questioner. As stated above, the system may identify who is a questioner and a user(s) among a plurality of persons. The system may receive the question in a form of a text data or an audio data. In a case where the system receives the question in a form of the audio data, the system generates the text data from the audio data, using a speech-to-text technology.

Steps 303 and 304 correspond to steps 203 and 204 described in FIG. 2A, respectively. Accordingly, the overlapping explanations of steps 303 and 304 will be omitted here.

In step 305, the system obtains, using the questioner identifier, a first history on class labels which were assigned to questions made by the questioner in the past.

The first history may be, for example, but not limited to, in a form of a database for storing questioner context information (hereinafter also referred to as "questioner context database"). The first history may store the following information: a questioner identifier and a history of record which is associated with the questioner identifier. The history of record may include, for each a questioner identifier, one or more sets of a class label and a time stamp. Alternatively, the history of record may be generated for each of the questioner identifiers and each of the history of records may include one or more sets of a class label and a time stamp.

For the class label and the timestamp, the explanations mentioned above can be applied here.

The first history can be dynamically generated by the system, as seen in step 321 described in FIG. 3C mentioned below.

In step 306, the system chooses a first class label among the class labels in the first history. The system may choose, among the class labels in the first history, a class label assigned to a question which was made just before the received question, using the timestamp. The question identifier obtained from step 304 or 307 and the first class label is used in the following steps.

In step 307, the system assigns a questioner identifier to the questioner. The system may further choose a default class label which is in advance determined by an operator or administrator of a system according to an embodiment of the present invention. The default class label is chosen from that assigned to any node in the hierarchical structure database.

Steps 307 and 308 correspond to steps 207 and 208 described in FIG. 2A, respectively. Accordingly, the overlapping explanations of steps 307 and 308 will be omitted here.

Figure 3B:
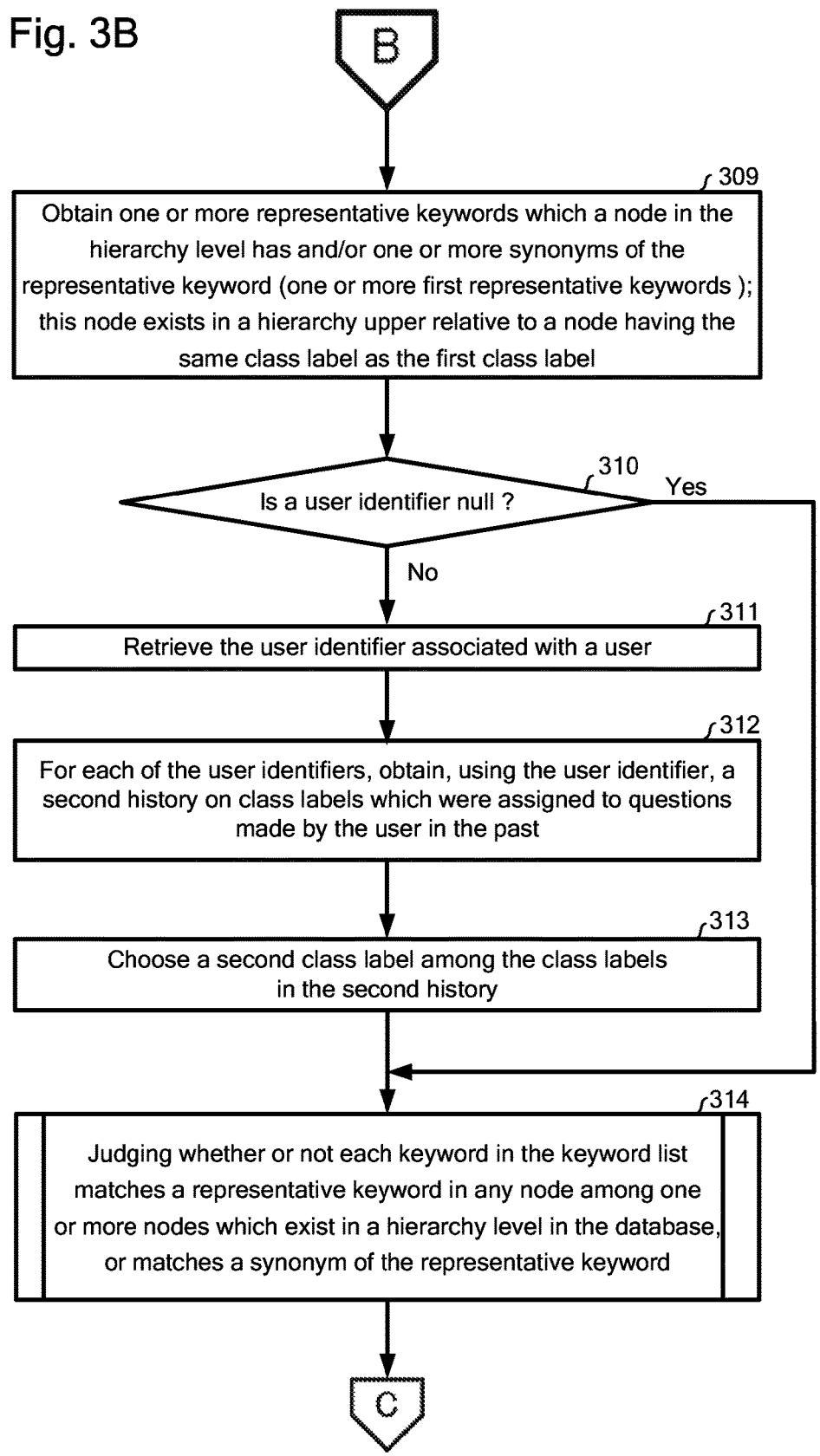
Figure 3C:
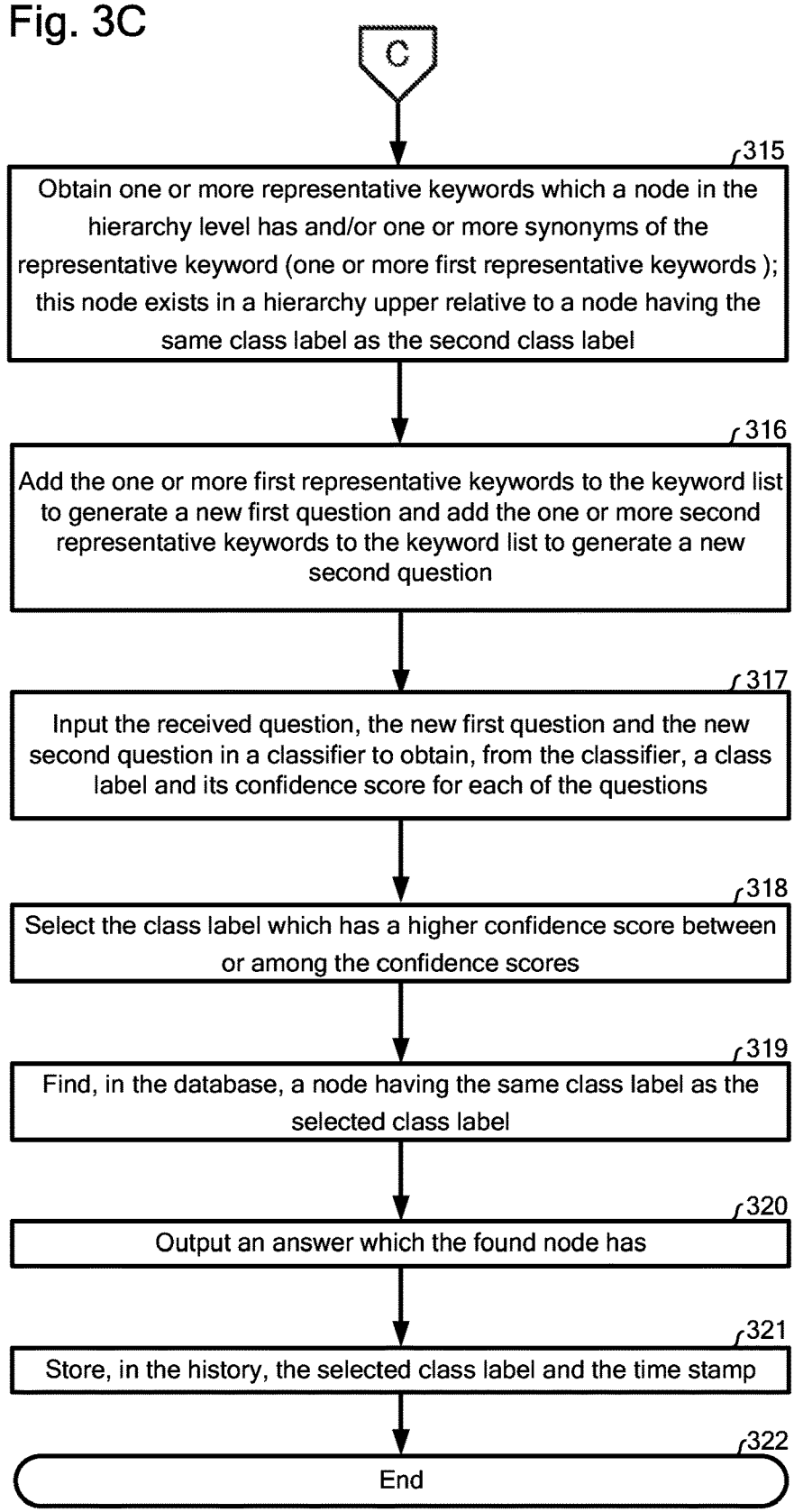
Figure 3D:
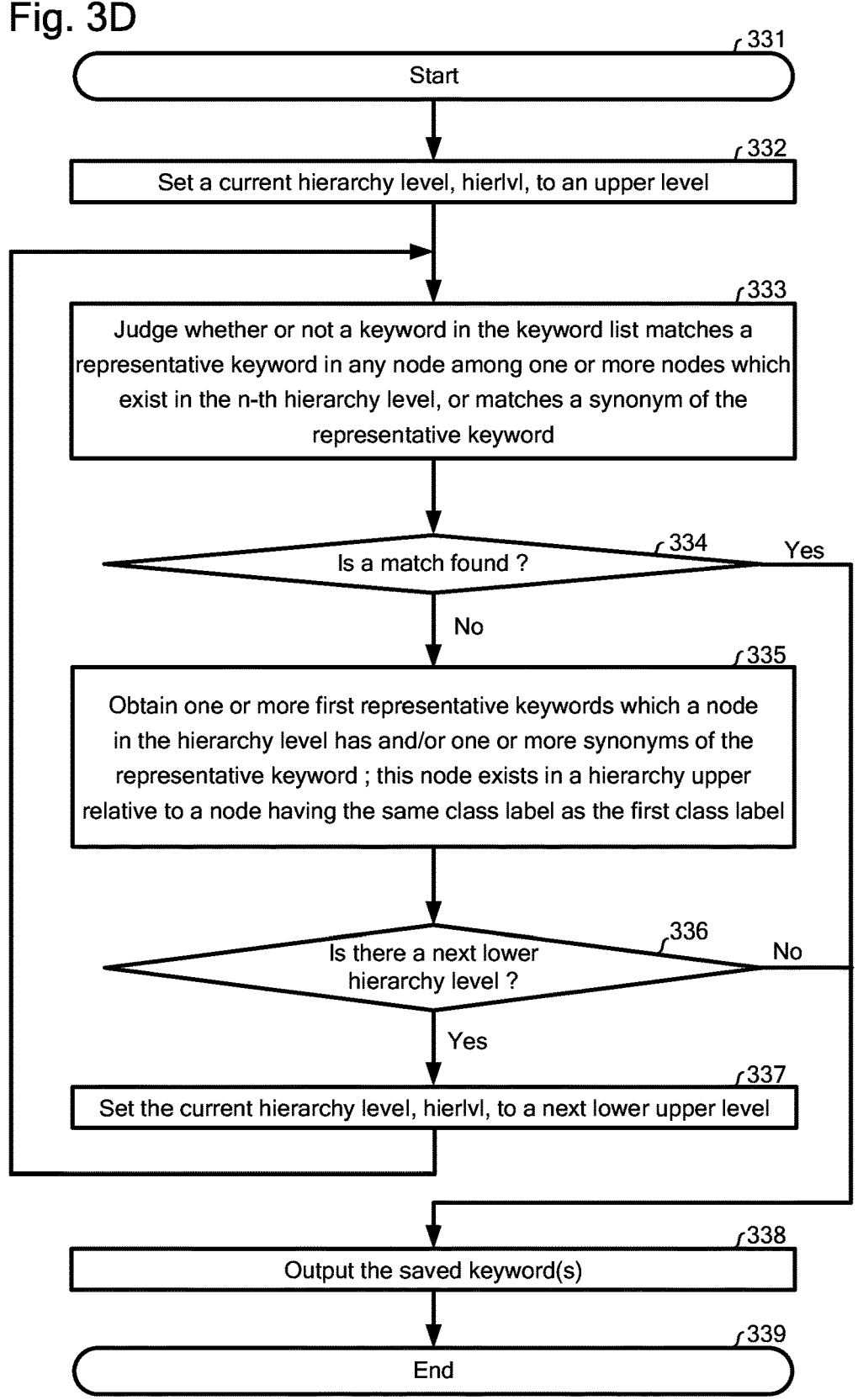

One embodiment of the judgment described in step 308 will be shown FIG. 3D.

With reference now to FIG. 3D, in step 331, the system starts the process for the judgment described in step 308.

Steps 332 to 334 correspond to steps 232 and 234 described in FIG. 2C, respectively. Accordingly, the overlapping explanations of steps 332 to 334 will be omitted here.

In step 335, the system obtains one or more first representative keywords which a node in the present hierarchy level has and/or the synonym of the representative keyword, where this node exists in a hierarchy upper relative to a node having the same class label as the first class label, and then save, into the keyword list, the obtained one or more representative keywords or the obtained synonym. The obtained one or more representative keywords are in the node having the n-th hierarchy level. Further, in a case where the hierarchical structure database has a synonym, the obtained one or more synonyms are in the node having the n-th hierarchy level.

Steps 336 to 338 correspond to steps 236 and 238 described in FIG. 2C, respectively. Accordingly, the overlapping explanations of steps 336 to 338 will be omitted here.

In step 339, the system terminates the process for the judgment described in step 308.

With reference now to FIG. 3B, in step 309, the system obtains one or more representative keywords which a node in the hierarchy level has and/or one or more synonyms of the representative keyword (hereinafter, the obtained one or more representative keywords and/or the obtained one or more synonyms are totally referred to as "one or more first representative keywords"), where this node exists in a hierarchy upper relative to a node having the same class label as the first class label. Alternatively, in a case where the process described in FIG. 3D is done, the system may read the keyword(s) which was output in step 338 described in FIG. 3D.

In step 310, the system judges whether a user identifier associated with the user is null in a storage, such as a list or database, for storing one or more sets of a user identifier and biometric information on a user associated with the user identifier (hereinafter also referred to as "user list"). The user is a person who exists around the questioner. The user may also detectable by the answering machine. A user identifier is also called as a questioner identifier in a case where a user associated with the user identifier is identified as a questioner. Accordingly, the user list may be the same object as the questioner list mentioned above.

The user identifier may refer to an identifier uniquely associated with one person. Accordingly, in a case where a user is identified using the biometric information, the user identifier can be retrieved, using the biometric information on a user associated with the user.

In a case where it is the first time for the user to come the answering machine, it is likely that the user identifier may not be found in the user list. Meanwhile, in a case where it is the second or more time for the user to ask the question, the user identifier may be found in the user list.

In step 310, if the judgment is negative, the system proceeds to step 311. Meanwhile, if the judgment is positive, the system proceeds to step 313.

In step 311, the system retrieves, in the user list, the user identifier associated with the user.

In step 312, for each of the user identifiers, the system obtains, using the user identifier, a second history on class labels which were assigned to questions made by the user in the past.

The second history may be, for example, but not limited to, in a form of a database for storing questioner context information (hereinafter also referred to as "questioner context database"). The second history may store the following information: a user identifier and a history of record which is associated with the user identifier. The history of record may include, for each a second identifier, one or more sets of a class label and a time stamp. Alternatively, the history of record may be generated for each of the user identifiers and each of the history of records may include one or more sets of a class label and a time stamp.

For the class label and the timestamp, the explanations mentioned above can be applied here.

The second history can be dynamically generated by the system, as seen in step 321 described in FIG. 3C mentioned below.

In step 313, the system chooses a second class label among the class labels in the second history. The system may choose, among the class labels in the second history, a class label assigned to a question having the most recent timestamp in the one or more second histories. The user identifier obtained from step 304 or 307 and the second class label is used in the following steps.

In step 314, the system may read the list of keywords of the question which was obtained in step 308 described in FIG. 3A.

In step 314, the system further judges whether or not each keyword in the keyword list matches a representative keyword in any node among one or more nodes which exist in a hierarchy level in the database, or matches a synonym of the representative keyword.

One embodiment of the judgment described in step 314 will be shown FIG. 3E.

With reference now to FIG. 3E, in step 341, the system starts the process for the judgment described in step 314.

Steps 342 to 344 correspond to steps 232 to 234 described in FIG. 2C, respectively. Accordingly, the overlapping explanations of steps 342 to 344 will be omitted here.

In step 345, the system obtains one or more second representative keywords which a node in the present hierarchy level has and/or the synonym of the representative keyword, where this node exists in a hierarchy upper relative to a node having the same class label as the second class label, and then save, into the keyword list, the obtained one or more representative keywords or the obtained synonym. The obtained one or more representative keywords are in the node having the n-th hierarchy level. Further, in a case where the hierarchical structure database has a synonym, the obtained one or more synonyms are in the node having the n-th hierarchy level.

Steps 346 to 348 correspond to steps 236 and 238 described in FIG. 2C, respectively. Accordingly, the overlapping explanations of steps 346 to 348 will be omitted here.

In step 349, the system terminates the process for the judgment described in step 314.

With reference now back to FIG. 3C, in step 315, the system obtains one or more representative keywords which a node in the hierarchy level has and/or one or more synonyms of the representative keyword (hereinafter, the obtained one or more representative keywords and/or the obtained one or more synonyms are totally referred to as "one or more second representative keywords"), where this node exists in a hierarchy upper relative to a node having the same class label as the second class label. Alternatively, in a case where the process described in FIG. 2C is done, the system may read the keyword(s) which was output in step 238 described in FIG. 2C.

In step 316, the system adds the one more first representative keywords to the keyword list to generate a new first question. In a case where the process described in FIG. 3D is done, the one or more first representative keywords are combined each other to generate a combined keyword, and the combined keyword is added to the keyword list to generate a new first question.

Further, in step 316, the system adds the one more second representative keywords to the keyword list to generate a new second question. In a case where the process described in FIG. 3E is done, the one or more second representative keywords are combined each other to generate a combined keyword, and the combined keyword is added to the keyword list to generate a new second question.

In step 317, the system inputs the question received in step 302 described in FIG. 3A and the new first and second questions generated in step 316 in a classifier and obtain, from the classifier, a class label and its confidence score for each of the questions. Any classifier known in the art can be used herein. For example, the classifier may IBM® Watson™ Natural Language Classifier on cloud base such as Bluemix® can be used.

In step 318, the system selects the class label which has a higher confidence score between or among the confidence scores. Alternatively, instead of selecting the class label which has a higher confidence score among the confidence scores, the system selects the class label which has a higher confidence score among the confidence scores (hereinafter also referred to as "a third class label"), each confidence score being obtained by inputting the received question and the new first question in the classifier, and selects the class label which has a higher confidence score among the confidence scores (hereinafter also referred to as "a fourth class label"), each confidence score being obtained by inputting the received question and the new second question in the classifier.

In step 319, the system finds, in the hierarchical structure database, a node having the same class label as the selected class label. Alternatively, the system finds, in the hierarchical structure database, a node having the same class label as the third class label and obtains a first answer which the found node has; and finds, in the hierarchical structure database, a node having the same class label as the forth class label and obtains a second answer which the found node has.

In step 320, the system outputs an answer which the found node has. Alternatively, the system outputs an answer having the higher confidence score among the first answer and the second answer or both of the first answer and the second answer. In a case where the answer is latter case, the output may be a consecutive answer of the first answer and the second answer.

The system may transfer the output answer to the answering machine. The answering machine may perform a speech output or screen output of the answer, using the output answer.

In step 321, the system stores, in the first history, the selected class label and the time stamp, for example, using the question identifier. Accordingly, the first history can be dynamically updated. The storing can be performed after the selection of class label described in step 318.

In step 321, the system further stores, in the second history, the selected class label, and the time stamp, using the user identifier. Accordingly, the second history can be dynamically updated. The storing can be performed after the selection of class label described in step 318.

In step 322, the system terminates the process, for example, at the time when the questioner leaves an area which can be detectable by the answering machine.

In the following, a detailed example according to an embodiment of the flowchart described in FIGS. 3A to 3D is described below.

Let us suppose the following case: a questioner ask a question, "Do you have options for flight delays?" to an answering machine.

According to step 306 described in FIG. 3A, the system chooses a first class label, "TRA_INFO_INTER_W", which was chosen by a first history obtained using a questioner identifier associated with the questioner.

According to step 308 described in FIG. 3A, the system obtains a list of keywords of the question, using the natural language processing, as follows: "have", "options", "about" and "flight delays".

According to step 332 described in FIG. 3D, the system sets a current hierarchy level, hierlvl, to a top level or the first hierarchy level in the hierarchical structure database (602).

According to step 333 described in FIG. 3D, the system judges whether or not a keyword in the keyword list in any node among one or more nodes (641 and 651) which exist in the first hierarchy level, or matches a synonym of the representative keywords which is had by each of the nodes (641 and 651).

Each of the nodes (641 and 651) which exist in the first hierarchy level does not have the representative words as those in the keyword list. Further, let us suppose that the keywords in the keyword list do not match a synonym of the representative keywords which is had by each of the nodes (641 and 651). Accordingly, the system proceeds to step 335 described in FIG. 3D.

In one embodiment of step 335, the system searches for a node having the same class label as the first class label, "TRA_INFO_INTER_W", in the hierarchical structure database (602) and, then, determines that the node (644) has the class label, "TRA_INFO_INTER_W", which is the same as the first class label. Accordingly, the system obtains a representative keyword, "travel insurance", in the node (641) which is in the first hierarchy level in the hierarchical structure database (602) and exists in a hierarchy upper relative to the node (644).

Alternatively, in another embodiment of step 335, the system searches for a node having the class label, "TRA_*", which shows the first hierarchy level in the hierarchical structure database (602) and, then, finds the node (641). Accordingly, the system obtains a representative keyword, "travel insurance", in the found node (641).

According to step 336 described in FIG. 3D, the system judges whether or not there is a next lower hierarchy level, or the second hierarchy level and, then, determines that there is the second hierarchy level in the hierarchical structure database (602).

According to step 337 described in FIG. 3D, the system sets the current hierarch level, hierlvl, to a next lower upper level or the second hierarchy level in the hierarchical structure database (602).

According to step 333, the system further judges whether or not a keyword in the keyword list in any node among one or more nodes (642, 643, 652 and 653) which exist in the second hierarchy level, or matches a synonym of the representative keywords which is had by each of the nodes (642, 643, 652 and 653).

Each of the nodes (642, 643, 652 and 653) which exist in the second hierarchy level does not have the representative words as those in the keyword list. Further, let us suppose that the keywords in the keyword list do not match the synonym of the representative keywords which is had by each of the nodes (642, 643, 652 and 653). Accordingly, the system proceeds to step 335 described in FIG. 3D.

In one embodiment of the judgment, the system may search for a node having the same class label as the first class label, "TRA_INFO_INTER_W", in the hierarchical structure database (602) and, then, determines that the node (644) has the class label, "TRA_INFO_INTER_W", which is the same as the first class label. Accordingly, the system obtains a representative keyword, "Information", in the node (642) which is in the second hierarchy level in the hierarchical structure database (602) and exists in a hierarchy upper relative to the node (644).

Alternatively, in another embodiment of the judgment, the system searches for a node having the class label, "TRA_INFO_*", which shows the second hierarchy level in the hierarchical structure database (602) and, then, finds the node (642). Accordingly, the system obtains a representative keyword, "Information", in the found node (642).

According to step 336, the system judges whether or not there is a next lower hierarchy level or the third hierarchy level and, then, determines that there is the third hierarchy level in the hierarchical structure database (602).

According to step 337, the system sets the current hierarch level, hierlvl, to a next lower upper level or the third hierarchy level in the hierarchical structure database (602).

According to step 333, the system further judges whether or not a keyword in the keyword list in any node among one or more nodes (644 to 647 and 654 to 658) which exist in the third hierarchy level, or matches a synonym of the representative keywords which is had by each of the nodes (644 to 647 and 654 to 658).

The node (646) which exists in the third hierarchy level has the keyword, "flight delay" which is the same as that in the keyword list.

Accordingly, according to step 338 described in FIG. 3D, the system outputs the representative keywords, "travel insurance" and "information".

According to step 313 described in FIG. 3B, the system chooses a second class label, "CAR_COVE_THEFT_W", which was chosen by a second history obtained using a user identifier associated with a user who exists around the questioner.

According to step 342 described in FIG. 3E, the system sets a current hierarchy level, hierlvl, to a top level or the first hierarchy level in the hierarchical structure database (602).

According to step 343 described in FIG. 3E, the system judges whether or not a keyword in the keyword list in any node among one or more nodes (641 and 651) which exist in the first hierarchy level, or matches a synonym of the representative keywords which is had by each of the nodes (641 and 651).

Each of the nodes (641 and 651) which exist in the first hierarchy level does not have the representative words as those in the keyword list. Further, let us suppose that the keywords in the keyword list do not match a synonym of the representative keywords which is had by each of the nodes (641 and 651). Accordingly, the system proceeds to step 345 described in FIG. 3E.

In one embodiment of step 345, the system searches for a node having the same class label as the first class label, "CAR_COVE_THEFT_W", in the hierarchical structure database (602) and, then, determines that the node (658) has the class label, "CAR_COVE_THEFT_W", which is the same as the first class label. Accordingly, the system obtains a representative keyword, "Car insurance", in the node (651) which is in the first hierarchy level in the hierarchical structure database (602) and exists in a hierarchy upper relative to the node (658).

Alternatively, in another embodiment of step 345, the system searches for a node having the class label, "CAR_*", which shows the first hierarchy level in the hierarchical structure database (602) and, then, finds the node (651). Accordingly, the system obtains a representative keyword, "car Insurance", in the found node (651).

According to step 346 described in FIG. 3E, the system judges whether or not there is a next lower hierarchy level, or the second hierarchy level and, then, determines that there is the second hierarchy level in the hierarchical structure database (602).

According to step 347 described in FIG. 3E, the system sets the current hierarch level, hierlvl, to a next lower upper level or the second hierarchy level in the hierarchical structure database (602).

According to step 343, the system further judges whether or not a keyword in the keyword list in any node among one or more nodes (642, 643, 652 and 653) which exist in the second hierarchy level, or matches a synonym of the representative keywords which is had by each of the nodes (642, 643, 652 and 653).

Each of the nodes (642, 643, 652 and 653) which exist in the second hierarchy level does not have the representative words as those in the keyword list. Further, let us suppose that the keywords in the keyword list do not match the synonym of the representative keywords which is had by each of the nodes (642, 643, 652 and 653). Accordingly, the system proceeds to step 345 described in FIG. 3E.

In one embodiment of the judgment, the system may search for a node having the same class label as the first class label, "CAR_COVE_THEFT_W", in the hierarchical structure database (602) and, then, determines that the node (658) has the class label, "CAR_COVE_THEFT_W", which is the same as the second class label. Accordingly, the system obtains a representative keyword, "coverage", in the node (653) which is in the second hierarchy level in the hierarchical structure database (602) and exists in a hierarchy upper relative to the node (658).

Alternatively, in another embodiment of the judgment, the system searches for a node having the class label, "CAR_COVE_*", which shows the second hierarchy level in the hierarchical structure database (602) and, then, finds the node (653). Accordingly, the system obtains a representative keyword, "coverage", in the found node (653).

According to step 346, the system judges whether or not there is a next lower hierarchy level or the third hierarchy level and, then, determines that there is the third hierarchy level in the hierarchical structure database (602).

According to step 347, the system sets the current hierarch level, hierlvl, to a next lower upper level or the third hierarchy level in the hierarchical structure database (602).

According to step 343, the system further judges whether or not a keyword in the keyword list in any node among one or more nodes (644 to 647 and 654 to 658) which exist in the third hierarchy level, or matches a synonym of the representative keywords which is had by each of the nodes (644 to 647 and 654 to 658).

The node (646) which exists in the third hierarchy level has the keyword, "flight delay" which is the same as that in the keyword list.

Accordingly, according to step 348 described in FIG. 3E, the system outputs the representative keywords, "car insurance" and "coverage".

As stated above, the system obtains the representative keywords, "travel insurance" and "information" and the representative keywords, "car insurance" and "coverage".

According to step 316, the system prepares keywords, "travel insurance"; and "travel insurance, information" which is a combination of the representative keywords, "travel insurance" and "information"; and the keywords, "car insurance" and "car insurance, coverage" which is a combination of the representative keywords, "car insurance" and "coverage".

After the preparation of the keywords, the system adds each of the keywords into the question, "Do you have options for flight delays?" to generate the following four new questions; "travel insurance, Do you have options for flight delays?"; "travel insurance, information, Do you have options for flight delays?"; "car insurance, Do you have options for flight delays?"; and "car insurance, coverage, Do you have options for flight delays?".

According to step 317 described in FIG. 3C, the system inputs the question, "Do you have options for flight delays?", and the new generated questions, "travel insurance, Do you have options for flight delays?"; "travel insurance, information, Do you have options for flight delays?"; "car insurance, Do you have options for flight delays?"; and "car insurance, coverage, Do you have options for flight delays?", into a classifier to obtain, from the classifier, a class label and its confidence score for each of the questions.

Let us suppose that a confidence score of each of the output class labels are as follows: 0.42; 0.95; 0.65; (class label extraction error); and (class label extraction error). The question, "travel insurance, Do you have options for flight delays?", has the terms, "travel insurance" and "flight delay". These terms strength the question which is had by the node (646) among all of the nodes (641 to 647 and 651 to 658). Accordingly, the classifier gives the confidence score, 0.95, to the question, "travel insurance, Do you have options for flight delays?" to assign the highest score to this question.

According to step 318 described in FIG. 3C, the system finds that "0.95" is the highest confidence score among the confidence scores. Accordingly, the system selects the class label, "TRA_COVE_FLIGH_W" which is returned from the classifier as the result of inputting the new question, "travel insurance, Do you have options for flight delays?".

According to step 319 described in FIG. 3C, the system finds, in the hierarchical structure database (602), the node (646) having the class label, "TRA_COVE_FLIGH_W".

According to step 320 described in FIG. 3C, the system outputs the answer, "Yes. You can add flight delay option to your travel insurance", which the found node (646) has.

According to step 321 described in FIG. 3C, the system stores, in the first history, the selected class label, "TRA_COVE_FLIGH_W" and the time stamp which indicate a time to receive the question "Do you have options for flight delays?" on the answering machine.

FIGS. 7A and 7B shows one embodiment of answers obtained according to a prior art and according to an embodiment of the present invention and an exemplified diagram of multi-users corresponding to a situation described in FIG. 7A, respectively.

With reference now to FIG. 7A, FIG. 7A illustrates Table (701) which shows answers to the consecutive questions. Let us consider the following four consecutive situations which are illustrated in FIG. 7B, in which consecutive questions were made.

With reference now to FIG. 7B, FIG. 7B illustrates the four situations (1) to (4).

Situation 1 (711): Person A (731) is standing at the front of the answering machine (721). Person A (731) is making a question, "Can I get online information about your travel insurance?", to the answering machine (721). Persons B (732) and C (733) are now walking close to the answering machine (721).

Situation 2 (712): Persons B (752) and C (753) are standing at the front of the answering machine (741). Person B (752) is making a question, "Can you provide bodily damage coverage for car?", to the answering machine (741).

Situation 3 (713): Person C (773) is making a consecutive question, "We need theft coverage for our baggage as well.", to the answering machine (761). After obtaining an answer from the answering machine (761), Person B (772) and C (773) is leaving from the answering machine (761).

Situation 4 (714): Person A (781) is again making a question, "Do you have options for flight delays?", to the answering machine (791).

With reference now back to FIG. 7A, FIG. 7A illustrates an answer to each of the consecutive questions which was made in the four situations mentioned above and obtained according to a prior art and according to the embodiment of the present invention.

For the prior art, a method for appending a current question to a prior question was used. For the embodiment of the present invention, the followings were used: a hierarchical structure database having three levels such as seen in the hierarchical structure database described in FIG. 6B was used as a hierarchical structure database; IBM® Watson™ Natural Language Classifier on Bluemix® was used as a classifier; the criteria of error for a confidence score obtained from the classifier was set to 0.4; one previous history of class label record was referred for the questioner and the user; a default class label was not set.; and for Persons A, B and C, no class label history recorded initially.

In the situation 1 (711), the answer obtained according to the prior art is the same as that obtained according to the embodiment of the present invention.

In the situation 2 (712), the answer obtained according to the prior art is the same as that obtained according to the embodiment of the present invention.

In the situation 3 (713), the answer obtained according to the prior art is "Yes. We can provide bodily coverage option for your car insurance." However, the answer is not appropriate. This is because the question made by Person B (752) is "We need theft coverage for our baggage as well." and the answer is for the question made by Person B (752) in the situation 2 (712) and not for the question made by Person C (773) in the situation 3 (713). Meanwhile, the answer obtained according to the embodiment of the present invention is "Yes. You can also add theft coverage for your car insurance." This answer is correct to the question made by Person C (773) in the situation 3 (713).

In the situation 4 (714), the answer obtained according to the prior art is "I am sorry I could not understand your question. Could you rephrase for me?" However, the answer is not appropriate. This is because the confidence score is too low and, therefore, the answering machine (781) cannot output the appropriate answer from the classifier. Meanwhile, the answer obtained according to the embodiment of the present invention is "Yes. You can add flight delay option to your travel insurance." This answer is correct to the question made by Person A (791) in the situation 4 (714).

Figure 8:
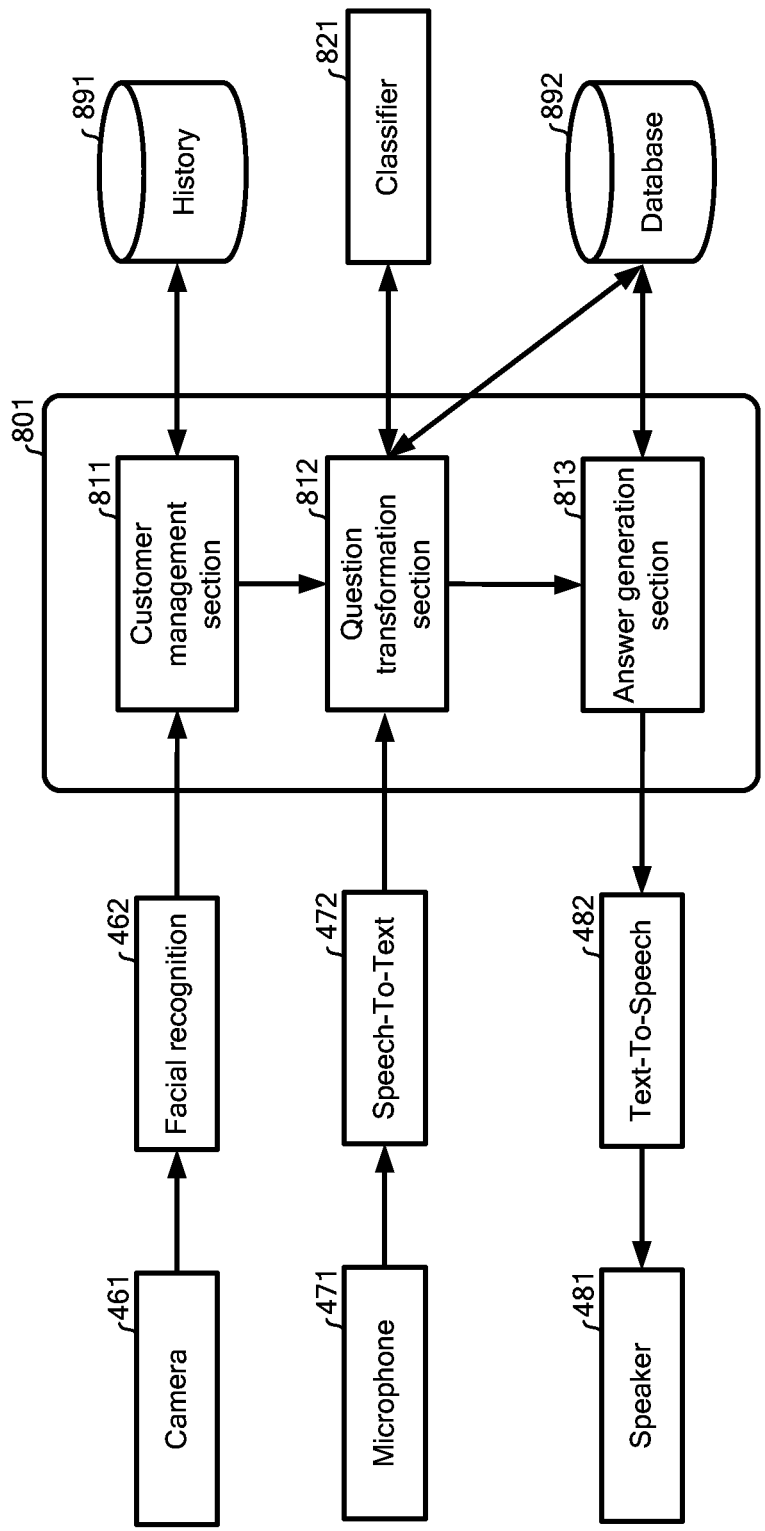
FIG. 8 illustrates an embodiment of an overall functional block diagram of a system hardware used in accordance with one embodiment of the flowcharts described in each of FIGS. 2A to 2C and FIGS. 3A to 3E.

With reference now to FIG. 8, FIG. 8 illustrates an embodiment of an overall functional block diagram of a system hardware used in accordance with one embodiment of the flowcharts described in each of FIGS. 2A to 2C and FIGS. 3A to 3D.

The system (801) comprises a customer management section (811), a question transformation section (812) and an answer generation section (813).

For one embodiment of the flowcharts described in each of FIGS. 2A to 2C, the system may perform the matters mentioned below.

The customer management section (811) retrieves a questioner identifier associated with a questioner in response to receipt of a question from the questioner; and obtains, using the questioner identifier, a history on class labels which were assigned to questions made by the questioner in the past and chooses a class label among the class labels in the history.

The customer management section (811) may perform steps 202 to 207 described in FIG. 2A.

The question transformation section (812) obtains a list of keywords of the question and judges whether or not each keyword in the keyword list matches a representative keyword in any node among one or more nodes which exist in a hierarchy level in the database, or matches a synonym of the representative keyword; in a case where no match is found, obtains one or more representative keywords which a node in the hierarchy level has and/or one or more synonyms of the representative keyword ("one or more first representative keywords"), this node existing in a hierarchy upper relative to a node having the same class label as the class label which is chosen among the class labels in the history; adds the obtained one or more first representative keywords to the keyword list to generate a new question; inputs the received question and the new question in a classifier to obtain, from the classifier, a class label and its confidence score for each of the questions; selects the class label which has a higher confidence score between or among the confidence scores; and finds, in the database, a node having the same class label as the selected class label and outputs an answer which the found node has.

The question transformation section (812) may perform steps 208 described in FIG. 2A, steps 209 to 219 and 221 described in FIG. 2B, and steps 232 to 238 described in FIG. 2C.

The answer generation section (813) outputs an answer via a speech output or screen output.

The answer generation section (813) may perform step 220 described in FIG. 2B.

For one embodiment of the flowcharts described in each of FIGS. 3A to 3E, the system may perform the matters mentioned below.

The customer management section (811) retrieves a questioner identifier associated with a questioner and a user identifier associated with each of one or more users who exist around the questioner in response to receipt of a question from the questioner; obtains, using the questioner identifier, a first history on class labels which were assigned to questions made by the questioner in the past and chooses a first class label among the class labels in the first history; for each of the user identifiers, obtains, using the user identifier associated with the user, a second history on class labels which were assigned to questions made by the user in the past and, for each of one or more second histories, chooses a second class label among the class labels in the second history corresponding to the use.

The customer management section (811) may perform steps 302 to 307 described in FIG. 3A and steps 310 to 313 described in FIG. 3B.

The question transformation section (812) obtains a list of keywords of the question and judges whether or not each keyword in the keyword list matches a representative keyword in any node among one or more nodes which exist in a hierarchy level in the database, or matches a synonym of the representative keyword; in a case where no match is found, obtains one or more representative keywords which a node in the hierarchy level has and/or one or more synonyms of the representative keyword ("first representative keywords"), this node existing in a hierarchy upper relative to a node having the same class label as the first class label; and obtains one or more representative keywords which a node in the hierarchy level has and/or one or more synonyms of the representative keywords ("second representative keywords"), this node existing in a hierarchy upper relative to a node having the same class label as the second class label; adds the one or more first representative keywords to the keyword list to generate a new first question and adds the one or more second representative keywords to the keyword list to generate a new second question; inputs the received question, the new first question and the new second question in a classifier to obtain, from the classifier, a class label and its confidence score for each of the questions; selects the class label which has a higher confidence score among the confidence scores; and finds, in the database, a node having the same class label as the selected class label and outputs an answer which the found node has.

The question transformation section (812) may perform step 308 described in FIG. 3A, steps 309 and 314 described in FIG. 3B, steps 315 to 319 and 321 described in FIG. 3C, steps 332 to 338 described in FIG. 3D and steps 342 to 348 described in FIG. 3E.

The answer generation section (813) outputs an answer via a speech output or screen output. Alternatively, the answer generation section (813) outputs an answer having the higher confidence score among the first answer and the second answer or both of the first answer and the second answer.

The answer generation section (813) may perform step 320 described in FIG. 3C.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for answering consecutive questions, using a system which can access a database, the database having a hierarchical structure and each node in the hierarchical structure having a class label, one or more representative keywords, a question and an answer to the question, the method comprising:

receiving, from a questioner, a question stated in a natural language, the question being one of a set of consecutive questions received from at least one questioner;

retrieving a questioner identifier in response to receipt of the question from the questioner, the questioner identifier having been previously generated in response to receiving a previous question from the questioner, the questioner identifier being associated with the questioner;

generating, using the questioner identifier, a history of class labels assigned to questions previously received from the questioner;

assigning, to the question, a class label selected from among the class labels in the history;

generating a list of keywords from the question;

matching each keyword in the keyword list with the one or more representative keywords and synonyms thereof in any node among one or more nodes in a present hierarchy level of the database;

obtaining, in a case where no match is found in nodes of the present hierarchy level, one or more representative keywords and synonyms included in a higher node as one or more first representative keywords, the higher node exists in a higher hierarchy level relative to a node having a same class label as the class label assigned to the question;

adding the one or more first representative keywords to the keyword list to generate a new question;

inputting the received question and the new question in a classifier to obtain, from the classifier, a class label and its confidence score for each of the questions;

selecting the class label which has a higher confidence score between or among the confidence scores; and finding, in the database, a node having the same class label as the selected class label; and outputting an answer included in the found node to the questioner.

2. The method according to claim 1, wherein the hierarchical structure has n hierarchy levels, n being an integer of at least one, judgment is done by judging whether or not a keyword in the keyword lists matches a representative keyword in any node among one or more nodes which exist in an n-th hierarchy level, or matches a synonym of the representative keyword; and an obtained one or more representative keywords are in the node having the n-th hierarchy level.

3. The method according to claim 1, wherein judgment is done, starting at a first hierarchy level and moving to a lower level until the match is found, the one or more first representative keywords which are obtained in each of the different hierarchy levels are combined with each other to generate a combined keyword, and the combined keyword is added to the keyword list to generate the new question.

4. The method according to claim 1, wherein the selected class label and a timestamp are stored in the history.

5. The method according to claim 1, wherein a chosen class label is a class label assigned to a question which was made previous to the received question.

6. The method according to claim 1, wherein, in a case where no questioner identifier is found, the questioner identifier is assigned to the questioner, and a default class label is chosen instead of choosing the class label among the class labels in the history.

7. The method according to claim 1, wherein an output is a speech output or screen output of the answer.

8. A computer-implemented method for answering consecutive questions, using a system which can access a database, the database having a hierarchical structure and each node in the hierarchical structure having a class label, one or more representative keywords, a question and an answer to the question, the method comprising:

receiving, from a questioner, a question stated in a natural language, the question being one of a set of consecutive questions received from at least one questioner;

retrieving a questioner identifier and a user identifier, the user identifier being an identifier associated with each of one or more users within a defined proximity to the questioner, in response to receipt of the question from the questioner, the questioner identifier having been previously generated in response to receiving a previous question from the questioner, the questioner identifier being associated with the questioner;

generating, using the questioner identifier, a first history, the first history is a history off class labels assigned to questions previously received from the questioner assigning, to the question, a first class label selected from among the class labels in the first history;

generating, for each user identifier, a second history of class labels assigned to questions previously received from the associated user, and for each of one or more second histories, choosing a second class label, wherein the second class label is a class label among the class labels in the second history corresponding to the user;

generating a list of keywords from the question;

matching each keyword in the keyword list with the one or more representative keywords or a synonym thereof in any node among one or more nodes in a present hierarchy level of the database;

obtaining, in a case where no match is found in nodes of a present hierarchy level, one or more representative keywords and synonyms included in a node in the present hierarchy level as first representative keywords, the higher node exists in a higher hierarchy level relative to a node having the same class label as the first class label, and obtaining one or more representative keywords and synonyms included in a node in the present hierarchy level as second representative keywords, the higher node exists in a higher hierarchy level relative to a node having the same class label as the second class label;

adding the one or more first representative keywords to the keyword list to generate a new first question and adding the one or more second representative keywords to the keyword list to generate a new second question;

inputting the received question, the new first question and the new second question in a classifier to obtain, from the classifier, a class label and its confidence score for each of the questions;

selecting the class label which has a higher confidence score among the confidence scores; and finding, in the database, a node having the same class label as the selected class label and outputting an answer included in the found node.

9. The method according to claim 8, wherein the hierarchical structure has n hierarchy levels, n being an integer of at least one, a judgment is done by judging whether or not a keyword in keyword lists matches a representative keyword in any node among one or more nodes which exist in an n-th hierarchy level, or matches a synonym of the representative keyword; and the one or more first representative keywords are in the node having an n1-th hierarchy level; and the one or more second representative keywords are in the node having an n2-th hierarchy level, wherein the n1-th and the n2-th are the same or different from each other.

10. The method according to claim 8, wherein a judgment is done, starting at a first hierarchy level and moving to a lower level until the match is found, the one or more first representative keywords which are obtained in each of the different hierarchy levels are combined with each other to generate a combined first representative keyword, and the combined first representative keyword is added to the keyword list to generate a new question; and the one or more second representative keywords which are obtained in each of the different hierarchy levels are combined each other to generate a combined second representative keywords, and the combined second representative keywords are added to the keyword list to generate a new question.

11. The method according to claim 8, the method comprising:

instead of selecting the class label which has a higher confidence score among the confidence scores, selecting a third class label, wherein the third class label is the class label which has a highest confidence score among the confidence scores, each confidence score being obtained by inputting the received question and the new first question in the classifier, and selecting a fourth class label, wherein the fourth class label is the class label which has a higher confidence score among the confidence scores, each confidence score being obtained by inputting the received question and the new second question in the classifier; and instead of outputting the answer which the found node has, finding, in the database, a node having the same class label as the third class label and obtaining a first answer which a first found node has; and finding, in the database, a node having the same class label as the fourth class label and obtaining a second answer which a second found node has; and outputting an answer having the higher confidence score among the first answer and the second answer or both of the first answer and the second answer.

12. The method according to claim 11, wherein the output is a consecutive answer of the first answer and the second answer.

13. The method according to claim 8, wherein the selected class label and a timestamp are stored in the first history.

14. The method according to claim 8, wherein the first class label is a class label assigned to a question which was made previous to the received question.

15. The method according to claim 8, wherein the second class label is class label assigned to a question having a most recent timestamp in the one or more second histories.

16. The method according to claim 8, wherein, in a case where no questioner identifier is found, the questioner identifier is assigned to the questioner, and a default class label is chosen instead of choosing the first class label among the class labels in the first history.

17. The method according to claim 8, wherein a case where the questioner identifier is not found, instead of retrieving the second history and choosing the second class label, obtaining one or more first representative keywords and one or more second representative keywords, adding each of the one or more first representative keywords and the one or more second keywords to keyword lists to generate the new first question and the new second question, respectively, inputting the received question, the new first question and the new second question in the classifier to obtain, from the classifier, a class label and its confidence score for each of the questions, the method comprising:

obtaining a list of keywords of the question and judging whether or not each keyword in the keyword lists matches a representative keyword in any node among one or more nodes which exist in a hierarchy level in the database, or matches a synonym of the representative keyword;

in a case where no match is found in nodes of a present hierarchy level, obtaining the first representative keywords, wherein the first representative keywords are one or more representative keywords which a node in the present hierarchy level has one or more synonyms of the representative keywords;

adding the obtained one or more representative keywords to the keyword list to generate a new question; and inputting the received question and the new question in a classifier to obtain, from the classifier, a class label and its confidence score for each of the questions.

18. The method according to claim 8, the output is a speech output or screen output of the answer.

19. A system, comprising:

a memory storing a program and a database having a hierarchical structure and each node in the hierarchical structure having a class label, one or more representative keywords, a question and an answer to the question;

a processor executing the program stored in the memory, the program instructing the processor to perform an operation for answering consecutive questions by accessing the database, the operation comprising:

receiving, from a questioner, a question stated in a natural language, the question being one of a set of consecutive questions received from at least one questioner;

retrieving a questioner identifier, the questioner identifier having been previously generated in response to receiving a previous question from the questioner, the questioner identifier being an identifier associated with a questioner in response to receipt of the question from the questioner;

generating, using the questioner identifier a first history, wherein the first history is a history on class labels which were assigned to questions made by the questioner in the past and choosing a first class label, wherein the first class label is a class label among the class labels in the first history;

generating a list of keywords from the question;

matching each keyword in the keyword list with the one or more representative keywords and synonyms thereof in any node among one or more nodes in a present hierarchy level of the database;

in a case where no match is found in nodes of a present hierarchy level, obtaining one or more first representative keywords, the one or more first representative keywords including one or more representative keywords and synonyms included in a higher node, the higher node existing in a higher hierarchy level relative to a node having the same class label as the first class label;

adding the one or more first representative keywords to the keyword list to generate a new first question;

inputting the received question and the new first question in a classifier to obtain, from the classifier, a class label and a confidence score for each of the questions;

selecting the class label which has a higher confidence score between the confidence scores; and finding, in the database, a node having the same class label as the selected class label and outputting an answer included in the found node to the questioner.

20. The system according to claim 19, the operation further comprising:

retrieving a user identifier, wherein the user identifier is an identifier associated with each of one or more users who exist within a defined proximity to the questioner in response to receipt of a question from the questioner;

retrieving, using one or more user identifiers, a second history of a class label which was selected for each of one or more questions made by each of the one or more users in the past and choosing a second class label, wherein the second class label is a class label among the class labels in each of the second histories;

for each of the user identifiers, obtaining, using the user identifier associated with the user, a second history, wherein the second history is a history on class labels which were assigned to questions made by the user in the past and, for each of one or more second histories, choosing a second class label, wherein the second class label is a class label among the class labels in the second history corresponding to the user;

in a case where no match is found in nodes of a present hierarchy level, obtaining second representative keywords, wherein the second representative keywords are one or more representative keywords which a node in the present hierarchy level has one or more synonyms of the representative keyword;

adding the one or more second representative keywords to the keyword list to generate a new second question; and inputting the new second question in a classifier to obtain, from the classifier, a class label and its confidence score.

21. The system according to claim 19, wherein the hierarchical structure has n hierarchy levels, n being an integer of at least one; a judgment is done by judging whether or not a keyword in the keyword lists matches a representative keyword in any node among one or more nodes which exist in an n-th hierarchy level, or matches a synonym of the representative keyword; and the obtained one or more representative keywords are in the node having the n-th hierarchy level.

22. A computer program product for answering consecutive questions using a system which can access a database, the computer program product comprising a non-transitory computer usable storage medium having program instructions embodied therewith, the database having a hierarchical structure and each node in the hierarchical structure having a class label, one or more representative keywords, a question and an answer to the question, the program instructions executable by a computer to cause the computer to perform a method, the method comprising:

receiving, from a questioner, a question stated in a natural language;

retrieving, by a processor, a questioner identifier associated with the questioner in response to receipt of a question from the questioner, the questioner identifier having been previously generated in response to receiving a previous question from the questioner;

generating, by the processor, using the questioner identifier, a history of class labels which were assigned to questions made by the questioner in the past;

assigning, by the processor, a class label to the question, the class label selected from among the class labels in the history;

generating, by the processor, a list of keywords of the question;

matching, by a processor, each keyword in the keyword list with the one or more representative keywords and synonyms thereof in any node among one or more nodes in a present hierarchy level of the database;

in a case where no match is found in nodes of a present hierarchy level, obtaining, by the processor, one or more first representative keywords, wherein the one or more first representative keywords is one or more representative keywords and synonyms included in a higher node the higher node exists in a higher hierarchy level relative to a node having the same class label as the assigned class label;

adding, by the processor, the one or more first representative keywords to the keyword list to generate a new question;

inputting, by the processor, the received question and the new question in a classifier to obtain, from the classifier, a class label and its confidence score for each of the questions;

selecting, by the processor, the class label which has a higher confidence score;

finding, by the processor, a node having the selected class label in the database; and outputting an answer included in the found node to the questioner.

23. The computer program product according to claim 22, wherein the hierarchical structure has n hierarchy levels, wherein n is an integer of at least one, a judgment is done by judging whether or not a keyword in the keyword lists matches a representative keyword in any node among one or more nodes which exist in the n-th hierarchy level, or matches a synonym of the representative keyword; and the obtained one or more representative keywords are in a node having the n-th hierarchy level.

24. A computer program product for answering consecutive questions using a system which can access a database, the computer program product comprising a non-transitory computer readable storage medium having program instructions embodied therewith, the database having a hierarchical structure and each node in the hierarchical structure having a class label, one or more representative keywords, a question and an answer to the question, the program instructions executable by a computer to cause the computer to perform a method, the method comprising:

receiving, from a questioner, a question stated in a natural language, the question being one of a set of consecutive questions received from at least one questioner;

retrieving a questioner identifier, the questioner identifier being an identifier associated with a questioner, and at least one user identifier, the user identifier being an identifier associated with each of one or more users within a defined proximity to the questioner in response to receipt of the question from the questioner;

generating, a first history using the questioner identifier, the first history being a history of class labels assigned to questions previously received from the questioner, and choosing a first class label from among the class labels in the first history;

for each of the user identifiers, obtaining, using the user identifier associated with the user, a second history of class labels assigned to questions previously received from the user, for each of one or more second histories, choosing a second class label from among the class labels in the second history corresponding to the user;

generating a list of keywords from the question;

matching each keyword in the keyword list with the one or more representative keywords or a synonym thereof in any node among one or more nodes in a present hierarchy level of the database;

in a case where no match is found in nodes of the present hierarchy level, obtaining one or more first representative keywords, the first representative keywords including representative keywords and synonyms included in a higher node, the higher node existing in a higher hierarchy level relative to a node having the same class label as the first class label;

obtaining one or more second representative keywords, the second representative keywords including representative keywords and synonyms included in a higher node, the higher node existing in a higher hierarchy level relative to a node having the same class label as the second class label;

adding the one or more first representative keywords to the keyword list to generate a new first question and adding the one or more second representative keywords to the keyword list to generate a new second question;

inputting the received question, the new first question and the new second question in a classifier to obtain, from the classifier, a class label and its confidence score for each of the questions;

selecting the class label which has a higher confidence score among the confidence scores;

finding, in the database, a node having the same class label as the selected class label; and outputting an answer included in the found node to the questioner.

25. The computer program product according to claim 24, wherein the hierarchical structure has n hierarchy levels, wherein n is an integer of at least one, a judgment is done by judging whether or not a keyword in the keyword lists matches a representative keyword in any node among one or more nodes which exist in the n-th hierarchy level, or matches a synonym of the representative keyword; and the one or more first representative keywords are in the node having an n1-th hierarchy level; and the one or more second representative keywords are in the node having an n2-th hierarchy level, wherein the n1-th and the n2-th is the same or different from each other.

* * * * *